US012451086B2

(12) United States Patent
Sang et al.

(10) Patent No.: US 12,451,086 B2
(45) Date of Patent: Oct. 21, 2025

(54) DISPLAY DEVICE AND DRIVING METHOD THEREOF

(71) Applicant: LG Display Co., Ltd., Seoul (KR)

(72) Inventors: Woo Kyu Sang, Paju-si (KR); Moon Soo Chung, Paju-si (KR); Tae Hun Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/814,043

(22) Filed: Aug. 23, 2024

(65) Prior Publication Data

US 2025/0118268 A1 Apr. 10, 2025

(30) Foreign Application Priority Data

Oct. 5, 2023 (KR) ........................ 10-2023-0132364

(51) Int. Cl.
*G09G 3/3291* (2016.01)
*G09G 3/32* (2016.01)
*G09G 3/3258* (2016.01)

(52) U.S. Cl.
CPC ............. *G09G 3/3291* (2013.01); *G09G 3/32* (2013.01); *G09G 3/3258* (2013.01); *G09G 2310/0267* (2013.01); *G09G 2310/027* (2013.01); *G09G 2310/0275* (2013.01); *G09G 2320/0247* (2013.01); *G09G 2330/028* (2013.01)

(58) Field of Classification Search
CPC ....... G09G 3/3291; G09G 3/32; G09G 3/3258
See application file for complete search history.

(56) References Cited

FOREIGN PATENT DOCUMENTS

KR 10-2021-0073129 A 6/2021
KR 10-2022-0068537 A 5/2022

*Primary Examiner* — Sardis F Azongha
(74) *Attorney, Agent, or Firm* — Birch, Stewart, Kolasch & Birch, LLP

(57) ABSTRACT

A display device including a display panel including data lines, gate lines, power lines, and sub-pixels; a gate driver to supply a gate signal to the gate lines; a data driver configured to supply a data voltage to the data lines during a refresh frame period prior to a hold frame period; and a compensation voltage generator configured to during the hold frame period, output a first compensation voltage to the data lines instead of the data voltage supplied by the data driver, and output a second compensation voltage and a third compensation voltage to the power lines connected to the sub-pixels, and during the refresh frame period, output the second compensation voltage and the third compensation voltage to the power lines without outputting the first compensation voltage.

20 Claims, 20 Drawing Sheets

DISPLAY DEVICE AND DRIVING METHOD THEREOF

CROSS-REFERENCE TO RELATED APPLICATION

This application claims priority to Korean Patent Application No. 10-2023-0132364, filed in the Republic of Korea on Oct. 5, 2023, the entire contents of which is hereby expressly incorporated by reference into the present application.

BACKGROUND

Field

The present disclosure relates to a display device and a method for driving the same.

Discussion of the Related Art

An organic light-emitting display device includes an organic light-emitting diode (hereinafter referred to as "OLED") which emits light by itself and has the advantages of a fast response speed and a large luminous efficiency, luminance, and viewing angle. The organic light-emitting display device also has an excellent contrast ratio and color reproducibility as it can express black grayscales in full black.

Various studies are being conducted to reduce power consumption of the organic light-emitting display device. For example, the organic light-emitting display device can lower the driving frequency of the pixels to reduce power consumption under certain conditions. However, in this instance, the viewer may experience, for example, a flicker in the image reproduced on the display panel.

SUMMARY

Accordingly, one object of the present disclosure is to address the aforementioned and other drawbacks.

Another object of the present disclosure is to provide a display device and corresponding driving method capable of preventing image quality degradation when the driving frequency of pixels is lowered.

The problem to be solved by the present disclosure is not limited to those mentioned above, and other problems not mentioned will be clearly understood by those skilled in the art from the following description.

To achieve these and other advantages and in accordance with the purpose of the present invention, as embodied and broadly described herein, the present invention provides in one aspect a display device including a display panel having data lines, gate lines, power lines, sub-pixels, and a gate driver to supply a gate signal to the gate lines are disposed; a data driver configured to supply a data voltage to the data lines for a refresh frame period; and a compensation voltage generator configured to output a first compensation voltage, a second compensation voltage, and a third compensation voltage. The first compensation voltage is applied to the data lines during a hold frame period. During the refresh frame period, the data voltage, the second compensation voltage, and the third compensation voltage are applied to the sub-pixels. During the hold frame period, the first compensation voltage, the second compensation voltage, and the third compensation voltage are applied to the sub-pixels.

In addition, at least one of the first compensation voltage, the second compensation voltage, and the third compensation voltage can be variable. Further, each sub pixel can include a light-emitting element; a driving element including a gate electrode connected to a first node, a first electrode connected to a second node, a second electrode connected to a third node, and configured to drive the light-emitting element; a first switch element connected between the data lines and the second node and configured to supply the data voltage to the second node in response to a second scan signal; a second switch element connected between a first power line to which the second compensation voltage is applied and the second node and configured to supply the second compensation voltage to the second node in response to a third scan signal; and a third switch element connected between a second power line to which the third compensation voltage is applied and an anode electrode of the light-emitting element, and configured to supply the third compensation voltage to the anode electrode of the light-emitting element during the refresh frame period and the hold frame period. The first switch element can maintain an off-state during the hold frame period.

At least one of the second and third compensation voltages can have a higher voltage level in the refresh frame period than in the hold frame period.

At least one of the first compensation voltage, the second compensation voltage, and the third compensation voltage can be varied in its voltage level within a one frame period.

The voltage level of at least one of the first compensation voltage, the second compensation voltage, and the third compensation voltage is different depending on the position of the sub-pixel.

The voltage level of the first compensation voltage can rise continuously during the hold frame period. The voltage levels of at least one of the second compensation voltage and the third compensation voltage can rise and then fall in the refresh frame period and the hold frame period.

At least one of the second compensation voltage and the third compensation voltage can be changed in the form of a step or in the form of a linear voltage having a predetermined slope.

Each of the sub-pixels can include a driving element including a gate electrode connected to a first node, a first electrode connected to a second node, and a second electrode connected to a third node; a first switch element connected between the data lines and the second node, and configured to supply the data voltage to the second node during the refresh frame period; a second switch element connected between a first power line to which the second compensation voltage is applied and the second node, and configured to supply the second compensation voltage to the second node during the refresh frame period and the hold frame period; a third switch element connected between a second power line to which the third compensation voltage is applied and an anode electrode of the light-emitting element, and configured to supply the third compensation voltage to the anode electrode of the light-emitting element in response to a third scan signal; a fourth switch element connected between the first node and a fifth power line to which an initialization voltage is applied, and configured to supply the initialization voltage to the first node in response to a fourth scan signal; a fifth switch element connected between the first node and the third node, and configured to connect the first node to the third node in response to a first scan signal; a sixth switch element connected between a third power line to which a pixel driving voltage is applied and the second node, and configured to supply the pixel driving voltage to the second node in response to an emission control signal; a seventh switch element connected between the third node and a fourth node, and configured to connect the third node to the fourth node in response to the emission control signal; and a light-emitting element having an anode electrode connected to the fourth node and a cathode electrode connected to a fourth power line to which a cathode voltage is supplied.

The pixel driving voltage can be a voltage higher than the cathode voltage. A gate-high voltage of the first to fourth scan signals and the emission control signal can be higher than the pixel driving voltage, and a gate-low voltage of the first to fourth scan signals and the emission control signal can be lower than the cathode voltage. The initialization voltage can be a voltage lower than the lower limit voltage of the data voltage and higher than the cathode voltage.

The first switch element, the second switch element, the third switch element, the sixth switch element, and the seventh switch element can be turned on in response to the gate-low voltage. The fourth switch element and the fifth switch element can be turned on in response to the gate-high voltage. The first switch element, the fourth switch element, and the fifth switch element maintain an off-state during the hold frame period.

The driving period of the pixels can be divided into a first on-bias period, an initialization period, a sampling period, a second on-bias period, and a light emission period during the refresh frame period. During the first on-bias period, the voltage of the first scan signal, the third scan signal, and the fourth scan signal can be the gate-low voltage, and the voltage of the second scan signal and the emission control signal can be the gate-high voltage. During the initialization period, the voltage of the first to fourth scan signals and the emission control signal can be the gate-high voltage. During the sampling period, the voltage of the second scan signal and the fourth scan signal can be the gate-low voltage which is synchronized with the data voltage, and the voltage of the first scan signal, the third scan signal, and the emission control signal can be the gate-high voltage. During the second on-bias period, the voltage of the first scan signal, the third scan signal, and the fourth scan signal can be the gate-low voltage, and the voltage of the second scan signal and the emission control signal can be the gate-high voltage. During the light emission period of the refresh frame period, the voltage of the first scan signal, the fourth scan signal, and the emission control signal can be the gate-low voltage, and the voltage of the second scan signal and the third scan signal can be the gate-high voltage. The first to the seventh switch elements can be in an off-state during a floating period between the first on-bias period and the initialization period, a floating period between the sampling period and the second on-bias period, and a floating period between the second on-bias period and the refresh frame period.

The driving period of the pixels can be divided into a third on-bias period, a fourth on-bias period, and a light emission period during the hold frame period. During the third on-bias period and the fourth on-bias period, the voltage of the first scan signal, the third scan signal, and the fourth scan signal can be the gate-low voltage, and the voltage of the second scan signal and the emission control signal can be the gate-high voltage. During the light emission period of the hold frame period, the voltage of the first scan signal, the fourth scan signal, and the emission control signal can be the gate-low voltage, and the voltage of the second scan signal and the third scan signal can be the gate-high voltage. The first to seventh switch elements can be in an off-state during a floating period between the third on-bias period and the fourth on-bias period, and during a floating period between the fourth on-bias period and the light emission period of the hold frame period.

A display device according to another embodiment of the present disclosure includes: a display panel including a pixel array including a plurality of data lines, a plurality of gate lines intersecting the data lines, and pixels arranged in a matrix form, and further including power lines connected to constant voltage nodes of the pixels for driving the pixels; a gate driver to supply a gate signal to the gate lines; a data driver to supply a data voltage to the data lines; and a compensation voltage generator. The compensation voltage generator can output a first value of a first compensation voltage at a first time within a hold frame period, output a first value of a second compensation voltage at the first time within the hold frame period, output a first value of a third compensation voltage at the first time within the hold frame, output a second value of the first compensation voltage different than the first value of the first compensation voltage at a second time within the hold frame period, output a second value of the second compensation voltage different than the first value of the second compensation voltage at the second time within the hold frame period, and output a second value of the third compensation voltage different than the first value of the third compensation voltage at the second time within the hold frame period.

The compensation voltage generator can output a third value of the first compensation voltage different than the second value of the first compensation voltage at a third time within the hold frame period, output a third value of the second compensation voltage different than the second value of the second compensation voltage at the third time within the hold frame period, and output a third value of the third compensation voltage different than the second value of the third compensation voltage at the third time within the hold frame period.

The second value of the first compensation voltage can be higher than the first value of the first compensation voltage. The third value of the first compensation voltage can be higher than the second value of the first compensation voltage.

The second value of the second compensation voltage can be higher than the first value of the second compensation voltage. The third value of the second compensation voltage can be the same as the first value of the second compensation voltage. The second value of the third compensation voltage can be higher than the first value of the third compensation voltage. The third value of the third compensation voltage can be the same as the first value of the third compensation voltage.

The compensation voltage generator can generate a voltage level of the first compensation voltage to continuously rise during the first time, the second time and the third time of the hold frame period, and generate the voltage levels of the second compensation voltage and the third compensation voltage to rise and then fall in the first time, the second time and the third time in the hold frame period.

The first value of the first compensation voltage at the first time within the hold frame period can be less than the first value of the second compensation voltage and the first value of the third compensation voltage at the first time within the hold frame period. The first value of the third compensation voltage at the first time within the hold frame period can be between the first value of the first compensation voltage and the first value of the second compensation voltage at the first time within the hold frame period.

During the refresh frame period, the compensation voltage generator does not generate the first compensation voltage and instead the data driver outputs the data voltage.

The compensation voltage generator can vary the voltage level of the third compensation voltage differently in the refresh time period and the hold frame period.

The first time, the second time and the third time in the hold frame period correspond to a first row of pixels, a second row of pixels and a third row of pixels in the display panel.

A method driving the display device according to one embodiment of the present disclosure includes: supplying a gate signal to a plurality of gate lines during a refresh frame period and a hold frame period; supplying a data voltage to a plurality of data lines and supplying a first compensation voltage, a second compensation voltage, and a third compensation voltage to a pixel circuit during the refresh frame period; and supplying the first compensation voltage to the data lines and supplying the first compensation voltage, the second compensation voltage, and the third compensation voltage to the pixel circuit during the hold frame period.

The method can further include; varying at least one of the first compensation voltage, the second compensation voltage, and the third compensation voltage.

According to the present disclosure, the pixels can be driven by maintaining the data voltage, which has been stored in the refresh frame, in the hold frame, thereby driving the display device at low power.

According to the present disclosure, it is possible to improve the flicker of the pixels by applying the first compensation voltage, the second compensation voltage, and the third compensation voltage to the pixels and to reduce the difference in luminance characteristics of the pixels in the refresh frame and the hold frame, thereby improving the image quality of the display device when the driving frequency of the pixels is lowered.

According to the present disclosure, it is possible to minimize the flicker of the pixels by optimizing the voltage levels of each of the first compensation voltage, the second compensation voltage, and the third compensation voltage depending on the position of the pixels.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF EMBODIMENTS

Figure 1:
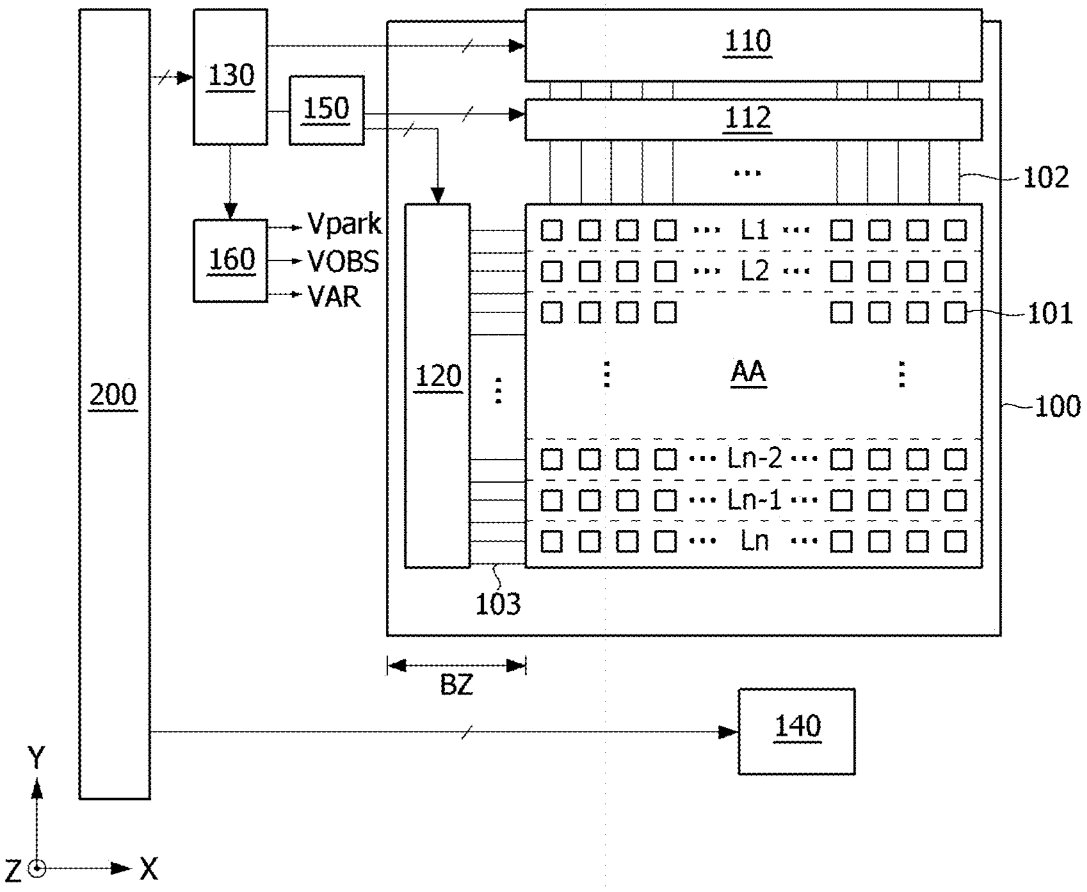
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present disclosure.

The terms such as “comprising,” “including,” “having,” and “containing” used herein are generally intended to allow other components to be added unless the terms are used with the term “only.” Any references to singular may include plural unless expressly stated otherwise. Components are interpreted to include an ordinary error range even if not expressly stated. When a positional or interconnected relationship is described between two components, such as “on top of,” “above,” “below,” “next to,” “connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used. The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be performed independently of or in association with each other. Further, the pixel circuit and the gate drive circuit of the display device transistors which can be implemented as a thin film transistor (TFT). The transistors can also be implemented as an oxide TFT including an oxide semiconductor, a low temperature poly silicon TFT (LTPS TFT) including a low temperature poly silicon, and the like.

Also, the transistor is a three-electrode element including a gate, a source, and a drain. The source is an electrode that supplies carriers to the transistor, and carriers flow from the source. Further, the drain is an electrode through which carriers exit from the transistor and carriers flow from the source to the drain. For an n-channel transistor, because carriers are electrons, a source voltage is lower than a drain voltage such that electrons flow from the source to the drain. That is, the n-channel transistor has a direction of a current flowing from the drain to the source. For a p-channel transistor (p-channel metal-oxide semiconductor (PMOS)), because carriers are holes, a source voltage is higher than a drain voltage such that holes flow from the source to the drain. In the p-channel transistor, because holes flow from the source to the drain, current flows from the source to the drain. In addition, the source and drain of the transistor are not fixed. For example, the source and drain can be changed according to an applied voltage. In the following description, the source and drain of the transistor will be referred to as a first electrode and a second electrode.

In addition, a gate signal swings between a gate-on voltage and a gate-off voltage, and the transistor is turned on in response to the gate-on voltage and is turned off in response to the gate-off voltage. For an n-channel transistor, the gate-on voltage can be a gate high voltage VGH, and the gate-off voltage can be a gate low voltage VGL. For a p-channel transistor, the gate-on voltage can be the gate low voltage VGL, and the gate-off voltage can be the gate high voltage VGH.

Hereinafter, various embodiments of the present disclosure will be described in detail with reference to the accompanying drawings. In particular, FIG. 1 is a block diagram illustrating a display device FIG. 2 is a cross-sectional view illustrating a cross-sectional structure of the display panel shown in FIG. 1, and FIG. 3 is a diagram schematically illustrating a display device of a mobile terminal according to embodiments of the present disclosure.

Figure 2:
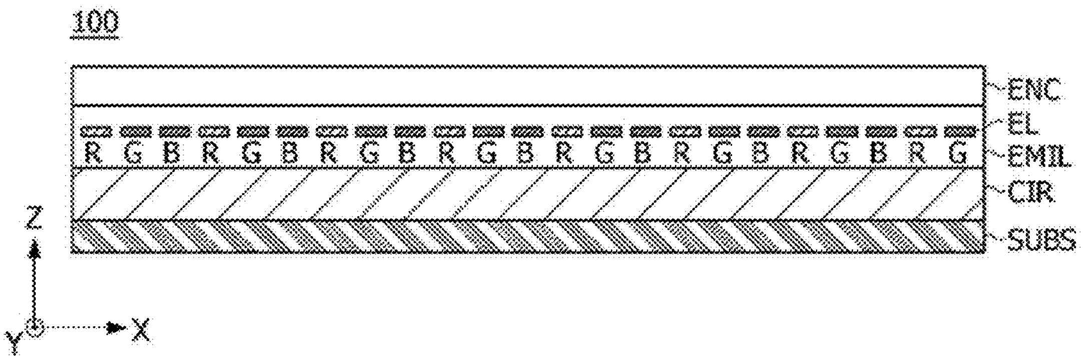
FIG. 2 is a cross-sectional view illustrating a cross-sectional structure of the display panel shown in FIG. 1.
Figure 3:
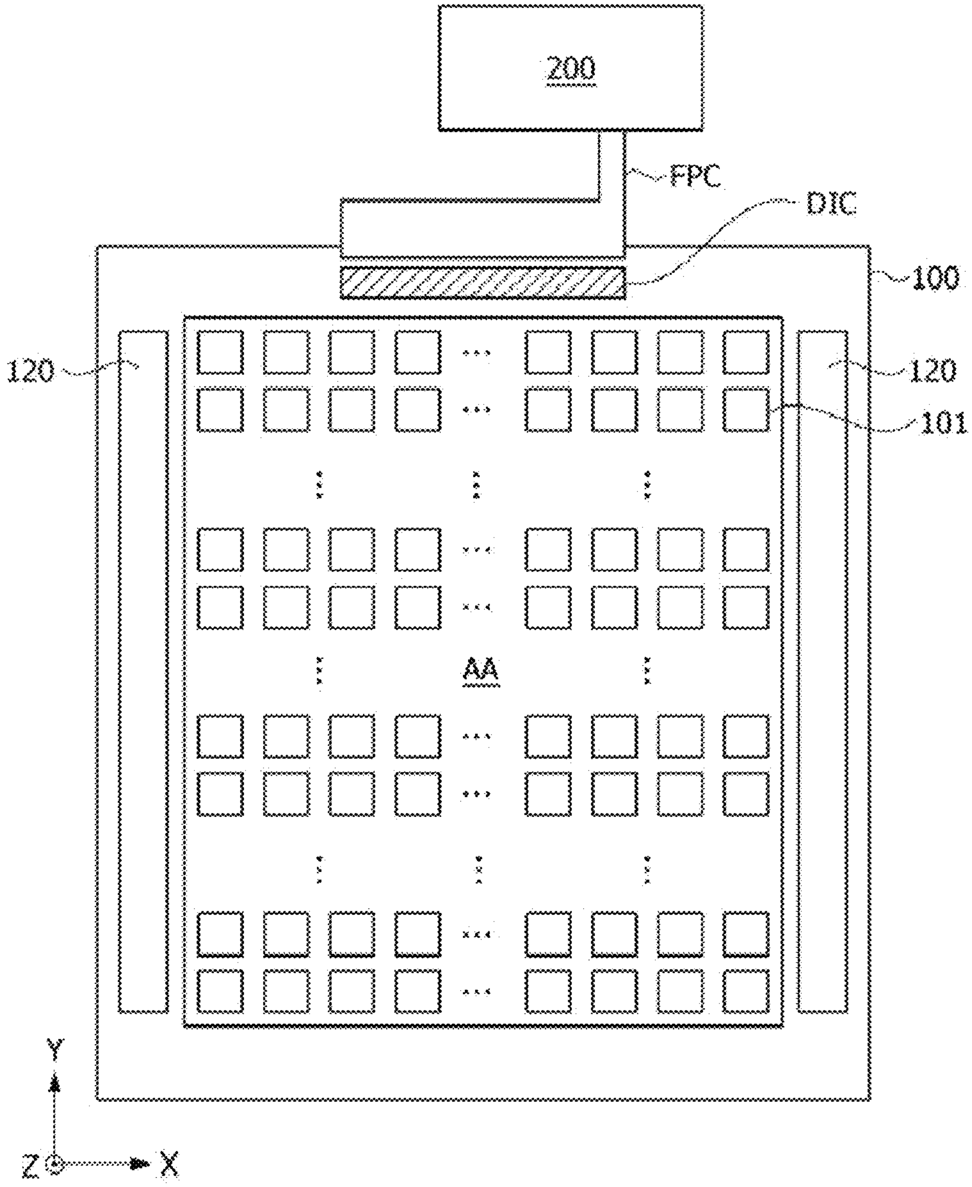
FIG. 3 is a diagram schematically illustrating a display device of a mobile terminal.

Referring to FIGS. 1 to 3, the display device includes a display panel 100, a display panel driving circuit for writing pixel data to pixels 101 of the display panel 100, and a power supply 140 for generating power used for driving the pixels and the display panel driving circuit. In addition, the display panel 100 can be made of a plastic substrate, a thin glass substrate, a metal substrate, or the like. The pixels 101 are also implemented on the display panel 100.

Further, the display panel 100 can be, but is not limited to, a panel having a rectangular structure with a length in the X-axis direction, a width in the Y-axis direction, and a thickness in the Z-axis direction. As shown, the display area AA of the display panel 100 includes a pixel array for displaying an input image thereon. In particular, the pixel array includes a plurality of data lines 102, a plurality of gate lines 103 intersecting the data lines 102, and the pixels 101 arranged in a matrix form. The display panel 100 can further include power lines commonly connected to the pixels 101. The power lines are connected to constant voltage nodes of the pixel circuits and supply the constant voltages used for driving the pixels 101 to the pixels 101.

Also, each pixel 101 can be divided into a red sub-pixel, a green sub-pixel, and a blue sub-pixel for color implementation, and also can further include a white sub-pixel. Each sub-pixel includes a pixel circuit for driving a light-emitting element and each of the pixel circuits is connected to the data lines, the gate lines, and the power lines. Hereinafter, a "pixel" can be interpreted as having the same meaning as a "sub-pixel."

In addition, the pixels can be arranged in the form of real color pixels and pentile pixels. In more detail, a pentile pixel can realize a higher resolution than a real color pixel by driving two sub-pixels having different colors as one pixel 101 by using a preset pixel rendering algorithm compensating for inadequate color representation in each pixel with the color of light emitted from its adjacent pixel.

Further, as shown in FIG. 1, the pixel array includes a plurality of pixel lines L1 to Ln in which each of the pixel lines L1 to Ln includes one line of pixels arranged along the line direction (X-axis direction) in the pixel array of the display panel 100. The pixels arranged in one pixel line also share the gate lines 103, and the sub-pixels arranged in the column direction (Y) along the data line direction share the same data line 102. Also, one horizontal period is a time obtained by dividing one frame period by the total number of pixel lines L1 to Ln.

The display panel 100 can be implemented with a non-transmissive display panel or a transmissive display panel. In particular, the transmissive display panel can be applied to a transparent display device in which an image is displayed on a screen and an actual object in the background is visible. The display panel 100 can also be made as a flexible display panel.

In addition, as shown in FIG. 2, the cross-sectional structure of the display panel 100 can include a circuit layer CIR, a light-emitting element layer EMIL, and an encapsulation layer ENC that are stacked on a substrate SUBS. The circuit layer CIR can include TFTarray including a pixel circuit connected to wires such as a data line, a gate line, a power line, and the like, a de-multiplexer array 112, and a gate driver 120. The circuit layer CIR also includes a plurality of metal layers insulated with insulating layers interposed therebetween, and a semiconductor material layer.

Further, the light-emitting element layer EMIL can include a light-emitting element EL driven by the pixel circuit. Also, the light-emitting element EL can include a light-emitting element of a red sub-pixel, a light-emitting element of a green sub-pixel, and a light-emitting element of a blue sub-pixel. The light-emitting element layer EMIL can further include a light-emitting element of white sub-pixel. The light-emitting element layer EMIL in each of the sub-pixels can have a structure in which the light-emitting element and a color filter are stacked. The light-emitting elements EL in the light-emitting element layer EMIL can also be covered by multiple protective layers including an organic film and an inorganic film.

In addition, the encapsulation layer ENC covers the light-emitting element layer EMIL to seal the circuit layer CIR and the light-emitting element layer EMIL. The encapsulation layer ENC can also have a multi-insulating film structure in which an organic film and an inorganic film are alternately stacked. Further, the inorganic film blocks permeation of moisture and oxygen, and also planarizes the surface of the inorganic film. When the organic film and the inorganic film are stacked in multiple layers, the movement path of moisture and oxygen becomes longer compared to a single layer, so that the penetration of moisture and oxygen that affect the light-emitting element layer EMIL can be effectively blocked.

In addition, a touch sensor layer can be formed on the encapsulation layer ENC, and a polarizer or a color filter layer can be disposed thereon. The touch sensor layer can include capacitive touch sensors that sense a touch input based on a change in capacitance before and after the touch input. Also, the touch sensor layer can include metal wire patterns and insulating films that forms the capacitance of the touch sensors. Further, the insulating films can insulate a portion where the metal wire patterns are intersected, and can planarize the surface of the touch sensor layer. The polarizer can also improve visibility and contrast ratio by converting the polarization of external light reflected by metal of the touch sensor layer and the circuit layer. In addition, the polarizer can be implemented as a polarizer or a circular polarizer to which a linear polarizer and a phase retardation film are bonded. Also, a cover glass can be adhered to the polarizer, and the color filter layer can include red, green, and blue color filters. The color filter layer can further include a black matrix pattern. In addition, the color filter layer can replace the polarizer by absorbing a part of the wavelength of light reflected from the circuit layer and the touch sensor layer, and increase the color purity of an image reproduced in the pixel array.

Further, the power supply 140 generates the constant voltages (or direct current (DC) voltages) used for driving the pixel array and the display panel driving circuit of the display panel 100 using a DC-DC converter. In particular, the DC-DC converter can include a charge pump, a regulator, a buck converter, a boost converter, and the like. Also, the power supply 140 can adjust the level of the DC input voltage applied from a host system 200 to output the constant voltages such as a gamma reference voltage, a gate-high voltage, a gate-low voltage, a pixel driving voltage, a cathode voltage, and an initialization voltage. The gamma reference voltage is supplied to the data driver 110. A dynamic range of the data voltage output from the data driver 110 is also determined by a voltage range of the gamma reference voltage and is the range of voltages between the uppermost grayscale voltage and the lowermost grayscale voltage.

In addition, the gate-high voltage and the gate-low voltage are supplied to a level shifter 150 and the gate driver 120. The constant voltages such as the pixel driving voltage, the cathode voltage, and the initialization voltage are also supplied to the pixels 101 via the power lines commonly connected to the pixels 101.

Further, the pixel driving voltage can be output from a main power source of the host system 200 and supplied to the display panel 100. In this instance, the power supply 140 does not need to output the pixel driving voltage. The display panel driving circuit writes the pixel data of the input image to the pixels of the display panel 100 under the control of the timing controller 130. As shown in FIG. 1, the display panel driving circuit includes the data driver 110 and the gate driver 120. The display panel driving circuit can further include a de-multiplexer array 112 disposed between the data driver 110 and the data lines 102.

In addition, the de-multiplexer array 112 sequentially supplies a data voltage output from channels of the data driver 110 to the data lines 102 using a plurality of de-multiplexers (DEMUX). In more detail, a de-multiplexer can include a multiple of switch elements disposed on the display panel 100. When the de-multiplexer is disposed between the output terminals of the data driver 110 and the data lines 102, the number of the channels of the data driver 110 can be reduced. The de-multiplexer array 112 can also be omitted.

The display panel driving circuit can further include a touch sensor driver for driving touch sensors. Further, the data driver 110 and the touch sensor driver can be integrated into one drive IC (Integrated Circuit). In a mobile terminal or a wearable terminal, the timing controller 130, the power supply 140, the level shifter 150, the data driver 110, the touch sensor deriver, a compensation voltage generator, and the like can be integrated into one drive IC (DIC) as shown in FIG. 3.

Also, the data driver 110 receives the pixel data of the input image received as a digital signal from the timing controller 130 and outputs the data voltage. The data driver 110 also converts the pixel data of an input image into a gamma compensation voltage using a digital to analog converter (DAC) to output the data voltage. Further, the gamma reference voltage (VGMA) is divided into the gamma compensation voltage for each grayscale by a voltage divider circuit in the data driver 110, which is supplied to the DAC. The DAC then generates the data voltage as the gamma compensation voltage corresponding to the grayscale value of the pixel data. The data voltage from the DAC can also be output to the data lines 102 from the respective channels of the data driver 110 through an output buffer, or can be output to the data lines 102 through the de-multiplexer array 112.

In addition, the gate driver 120 can be formed in a circuit layer CIR on the display panel 100 together with the TFT array of the pixel array and wires. Also, the gate driver 120 can be disposed in the non-display area BZ outside the display area AA in the display panel 100, or at least a portion thereof can be disposed in the display area AA.

Further, the gate driver 120 can include a plurality of shift registers for sequentially shifting pulses of the gate signals. The gate driver 120 can also be disposed in either a left non-display area BZ or a right non-display area BZ outside the display area AA in the display panel 100 to supply the gate signals to the gate lines 103 in a single feeding method. In the single feeding method, the gate signals are applied to one ends of the gate lines. The gate driver 120 can also be disposed in the left non-display area BZ and the right non-display area BZ in the display panel 100 to apply the gate signals to the gate lines 103 in a double feeding method. In the double feeding method, the gate signals are applied simultaneously to both ends of the gate lines 103. At least some circuits of the gate driver 120 can be disposed within the display area AA.

In addition, the gate driver 120 sequentially outputs pulses of the gate signals to the gate lines 103 under the control of the timing controller 130. The gate driver 120 can sequentially supply the gate signals to the gate lines 103 by shifting the pulses of the gate signals using the shift register. Further, the gate driver 120 can utilize a plurality of shift registers to output a plurality of the gate signals having different phases, pulse widths, etc. A gate signal can include a scan signal and an emission control signal (hereinafter, referred to as an "EM signal") in the organic light-emitting display device.

The timing controller 130 receives from the host system 200 digital video data of the input image and a timing signal synchronized with this data. The timing signal can include a vertical synchronization signal Vsync, a horizontal synchronization signal Hsync, and a data enable signal DE. Because a vertical period and a horizontal period can be known by counting the data enable signal DE, the vertical synchronization signal Vsync and the horizontal synchronization signal Hsync can be omitted. The data enable signal DE also has an interval of one horizontal period (1H).

In addition, the timing controller 130 generates a data timing control signal for controlling the operation timing of the data driver 110, a MUX control signal for controlling the operation timing of the de-multiplexer array 112, and a gate timing control signal for controlling the operation timing of the gate driver 120 based on the timing signals Vsync, Hsync, and DE received from the host system 200. The timing controller 130 also synchronizes the data driver 110, the de-multiplexer array 112, the touch sensor driver, and the gate driver 120 by controlling the operation timing of the display panel driving circuit.

Further, the gate timing control signal generated from the timing controller 130 can be input to the shift register in the gate driver 120 through the level shifter 150. The gate timing control signal can include a start pulse, clock, or the like. In addition, the level shifter 150 can receive the gate timing control signal to generate a start pulse and a shift clock, and provide them to the gate driver 120 through clock lines CL1 to CLn. The level shifter 150 can also supply the MUX control signal to the de-multiplexer array 112. An input signal to the level shifter 150 can be a signal of a digital signal voltage level, and an output signal from the level shifter 150 can be an analog voltage signal that swings between the gate-high voltage VGH and the gate-low voltage VGL.

In addition, the host system 200 can include a main board of any of a television system, a set-top box, a navigation system, a personal computer (PC), an in-vehicle system, a mobile terminal, or a wearable terminal. The host system can also scale an image signal from a video source to match the resolution of the display panel 100, and can transmit it to the timing controller 130 together with the timing signal.

In a mobile system, the host system 200 can be implemented by an application processor (AP). The host system 200 can transmit the pixel data of the input image to the drive IC (DIC) shown in FIG. 3 through a mobile Industry Processor Interface (MIPI). As shown in FIG. 3, the host system 200 can be connected to the drive IC (DIC) through a flexible printed circuit (FPC). The drive IC can also be bonded to the display panel 100 in a COG (Chip on Glass) process. The drive IC can be mounted on a flexible circuit film and electrically connected to the wires on the display panel 100.

Further, the display panel driving circuit can include the compensation voltage generator 160 that outputs the compensation voltages Vpark, VOBS, and VAR. At least a portion of the compensation voltage generator 160 can use resources from other components, such as the power supply 140, the data driver 110, the display panel 100, and the like. The compensation voltage generator 160 can vary the voltage level of each of the compensation voltages Vpark, VOBS, and VAR under the control of the timing controller 130. The power supply 140 can be implemented as a single power supply IC together with the compensation voltage generator 160.

Each of the sub-pixels includes a driving element for driving the light-emitting element and a pixel circuit including a capacitor connected to the driving element. The pixel circuit of each of the sub-pixels can include an internal compensation circuit to compensate the data voltage by a threshold voltage of the driving element.

Figure 4:
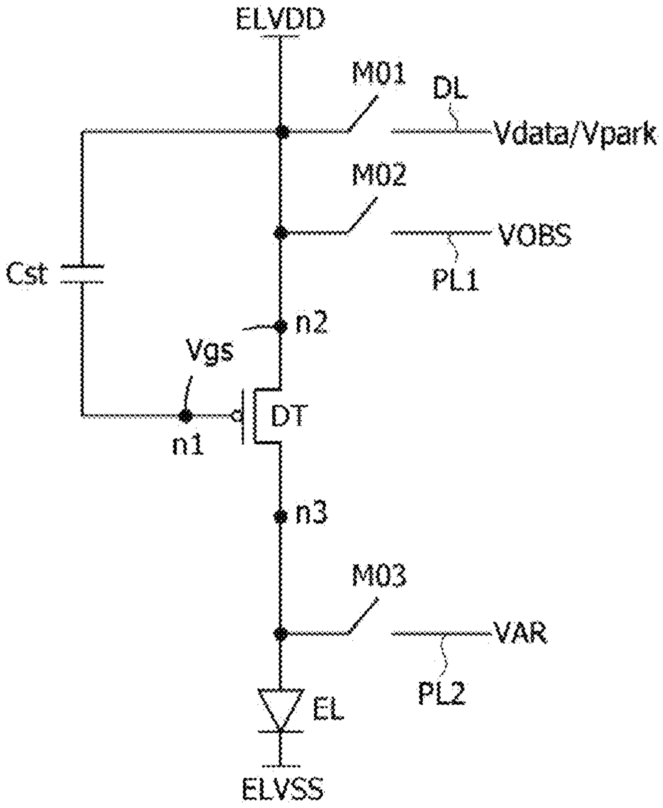
FIG. 4 is a circuit diagram illustrating a pixel circuit according to an embodiment of the present disclosure.
Figure 5:
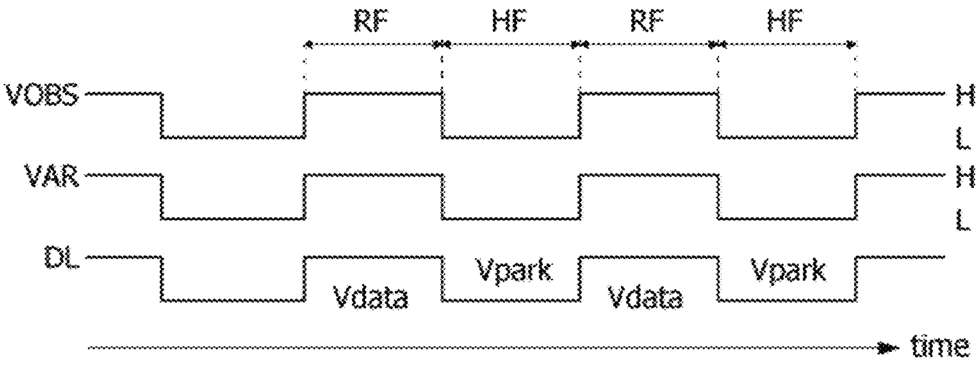
FIG. 5 is a waveform diagram illustrating compensation voltages according to one embodiment of the present disclosure.

Next, FIG. 4 is a circuit diagram illustrating a pixel circuit, and FIG. 5 is a waveform diagram illustrating compensation voltages according to one embodiments of the present disclosure. Referring to FIGS. 4 and 5, the pixel circuit includes a light-emitting element EL, a driving element DT for driving the light-emitting element EL, a plurality of switch elements M01, M02, and M03, and a capacitor Cst. The driving element DT and the switch elements M01, M02, M03 can be implemented as transistors.

In addition, the pixel circuit can be connected to a data line DL, a plurality of gate lines, and a plurality of power lines. A gate signal is applied to the gate lines that are omitted in FIG. 4. The power lines can include a constant voltage node to which a pixel driving voltage ELVDD is applied, a power line to which a cathode voltage ELVSS is applied, and power lines PL1 and PL2 to which compensation voltages VOBS and VAR are applied. The power lines can be commonly connected to all of the sub-pixels.

Further, the driving element DT generates a current for driving the light-emitting element EL according to a gate-source voltage Vgs thereof. As shown, the driving element DT includes a gate electrode connected to a first node n1, a first electrode connected to a second node n2, and a second electrode connected to a third node n3. The pixel driving voltage ELVDD is applied to the second node n2. A switch element, omitted in this drawing, can be connected to the second node n2 and can supply the pixel driving voltage ELVDD to the second node n2 in response to the gate-on voltage of the gate signal.

Figure 7:
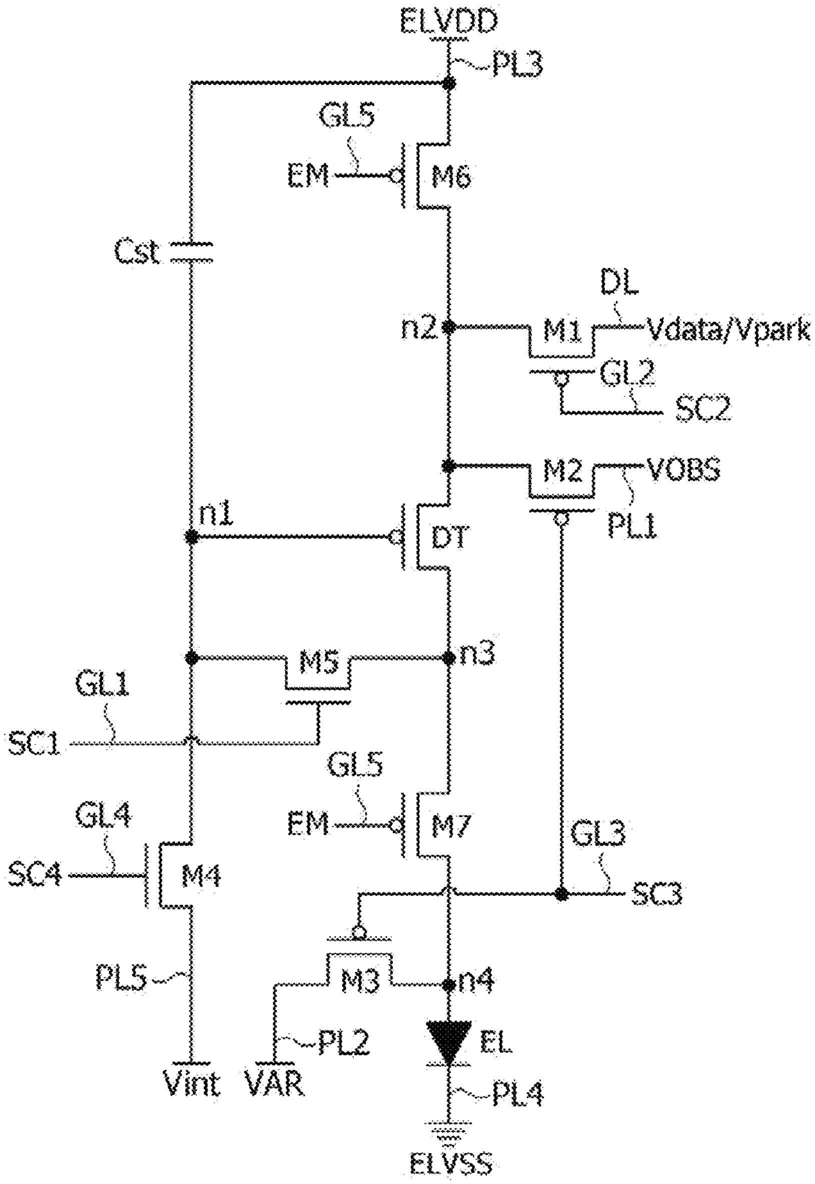
FIG. 7 is a circuit diagram illustrating a pixel circuit according to another embodiment of the present disclosure.

In addition, the light-emitting element EL can be implemented as an OLED or inorganic LED. The OLED includes an anode electrode, a cathode electrode, and an organic compound layer interposed between these electrodes. As shown in FIG. 3, the anode electrode of the light-emitting element EL is electrically connected to the third node n3, and a cathode electrode thereof is supplied with the cathode voltage ELVSS. The anode electrode of the light-emitting element EL can also be connected to a fourth node n4 as illustrated in FIG. 7. Further, the organic compound layer can include, but is not limited to, a hole injection layer (HIL), a hole transport layer (HTL), an light emission layer (EML), an electron transport layer (ETL), and an electron injection layer (EIL). When a voltage is applied to the anode and cathode electrodes of the light-emitting element EL, holes passing through the hole transport layer (HTL) and electrons passing through the electron transport layer (ETL) move to the light emission layer (EML) to form excitons. In this instance, visible light is emitted from the light emission layer EML. Also, the OLED can be implemented as an OLED having a tandem structure in which a plurality of light-emitting layers are stacked. In particular, the OLED having the tandem structure can improve the luminance and lifespan of the pixels.

Further, a switch element, omitted in this drawing, can be connected between the third node n3 and the anode electrode of the light-emitting element EL. This switch element can electrically connect the third node n3 to the anode electrode of the light-emitting element EL in response to the gate-on voltage of the gate signal.

In addition, as shown in FIG. 4, the capacitor Cst is connected between a node on the power line to which the pixel driving voltage ELVDD applied and the first node n1 to store the gate-source voltage Vgs of the driving element DT. A first switch element M01 is also connected between the second node n2 and the data line DL and electrically connects the data line DL to the second node n2 in response to the gate-on voltage of a first gate signal. A data voltage Vdata of the pixel data, or a first compensation voltage Vpark, is also applied to the data line DL. Therefore, the first switch element M01 supplies the data voltage Vdata applied through the data line DL to the second node n2, and is turned on in response to the gate-on voltage of the first gate signal during the refresh frame period, while remaining turned off state during the hold frame period.

Further, the data voltage Vdata of the pixel data is applied to the data lines DL during the refresh frame period when the pixel data is written to the pixels. Also, the first compensation voltage Vpark is set to a voltage to compensate for changes in the luminance of the pixels and is applied to the data lines DL during the hold frame period when no pixel data is written to the pixels. During the hold frame, the pixels 101 are driven with the data voltage Vdata charged to the capacitor Cst in a previous refresh frame.

In addition, the data voltage Vdata is applied to the second node n2 when the data line DL and the second node n2 are electrically connected by the turned-on second switch element M02. Also, the first compensation voltage Vpark can be applied to the second node n2 as a leakage current of a second switch element M02 in the off-state of the first switch element M01, that is, in a state in which the data line DL and the second node n2 are electrically disconnected, and can be applied to the first node n1 by a parasitic capacitance. Here, the parasitic capacitance can include a parasitic capacitance that exists between the first node n1 and the second node n2 and a parasitic capacitance that exists between the first node n1 and the data line DL. The gate-source voltage Vgs of the driving element DT can thus be finely tuned by the first compensation voltage Vpark.

Further, the second switch element M02 is connected between a first power line PL1 and the second node n2. A second compensation voltage VOBS can be applied to the first power line PL1 during the on-bias period set in each of the refresh frame period and the hold frame period. Also, the second compensation voltage VOBS can be set to an on-bias voltage that increases the gate-source voltage Vgs of the driving element DT such that the driving element DT can be always driven with the same driving characteristics.

In addition, the second switch element M02 is turned on in the OBS period of each of the refresh frame period and the hold frame period in response to the gate-on voltage of a second gate signal. When the second switch element M02 is turned on, the second compensation voltage VOBS can be applied to the second node n2 through the second switch element M02.

As shown, a third switch element M03 is connected between a second power line PL2 and the anode electrode of the light-emitting element EL. A third compensation voltage VAR can thus be supplied to the second power line PL2 and can be set to a different voltage between the refresh frame period and the hold frame period. The third compensation voltage VAR can be applied to the anode electrode of the light-emitting element EL at a higher voltage during the hold frame period to affect the luminance of the light-emitting element EL in the hold frame. The third compensation voltage VAR can also reduce a luminance difference of pixels between the refresh frame and the hold frame, especially the luminance difference of low-grayscale.

Further, the third switch element M03 is turned on in response to the gate high voltage VGH of the second gate signal in the refresh frame and the hold frame. When the third switch element M03 is turned on, the third compensation voltage VAR can be applied to the anode electrode of the light-emitting element EL through the third switch element M03.

In addition, the first compensation voltage Vpark can be a constant or variable voltage applied to the data line DL during the hold frame HF, as shown in FIG. 5. The data voltage Vdata of the pixel data can be applied to the data line DL during the refresh frame RF.

Further, the second and third compensation voltages VOBS and VAR can be generated as alternating voltages that vary between the refresh frame RF and the hold frame HF, as shown in FIG. 5. A high voltage (H) of the second and third compensation voltages VOBS and VAR can also be set to different voltages, and a low voltage (L) of the second and third compensation voltages VOBS and VAR can be set to different voltages. The second and third compensation voltages VOBS and VAR can also be generated as the high voltage (H) in the refresh frame RF and as the low voltage (L) in the hold frame HF. Thus, the second and third compensation voltages VOBS and VAR can change their voltage between the refresh frame RF and the hold frame HF.

Referring to FIG. 5, the first compensation voltage Vpark can be applied to the data line DL in the hold frame HF. Also, the second compensation voltage VOBS can be generated as the high voltage (H) in the refresh frame RF, while it can be generated as the low voltage (L) in the hold frame HF. The second compensation voltage VOBS can also change its voltage level during a vertical blank period between the refresh frame RF and the hold frame HF. Further, the third compensation voltage VAR can be generated as the high voltage (H) in the refresh frame RF, while it can be generated as the low voltage (L) in the hold frame HF. The third compensation voltage VAR can increase its voltage level during the vertical blank period between the refresh frame RF and the hold frame HF.

Figure 6A:
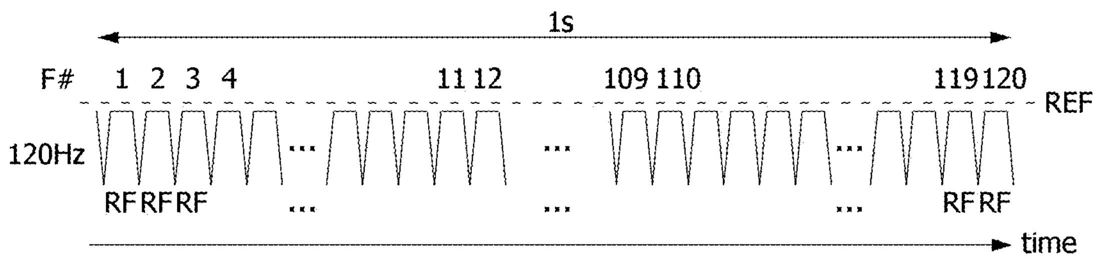
FIGS. 6A to 6E are waveform diagrams illustrating the luminance characteristics according to a driving frequency of pixels and a compensation voltage.
Figure 6B:
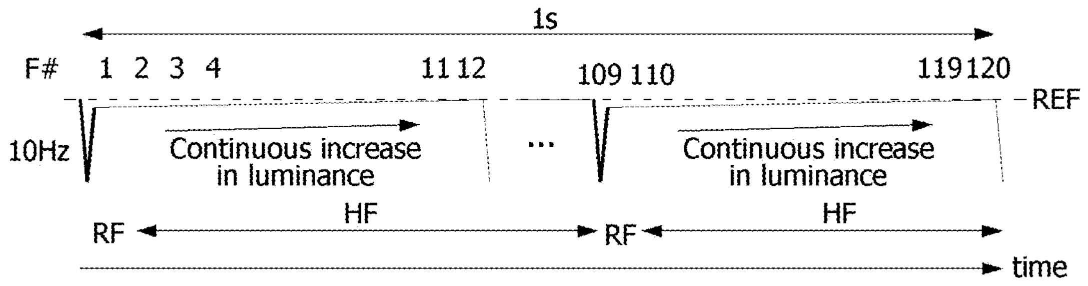
Figure 6C:
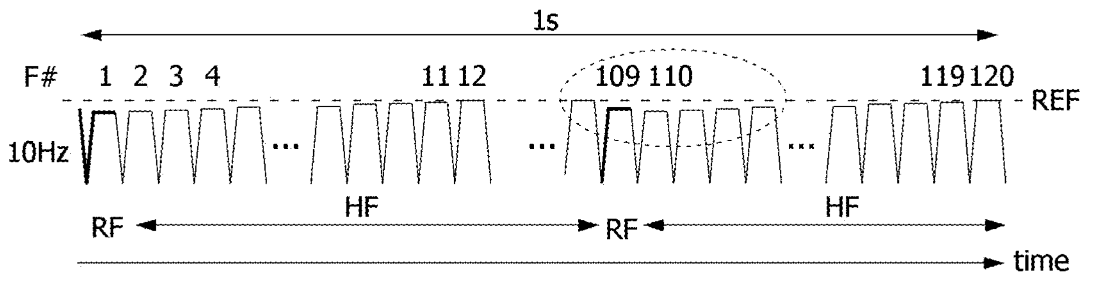
Figure 6D:
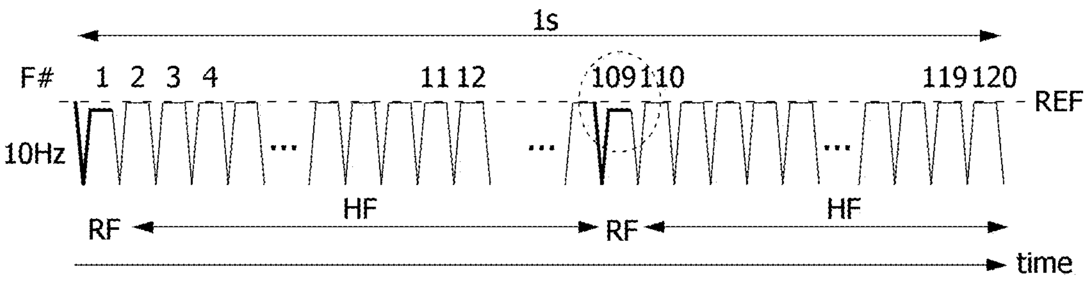
Figure 6E:
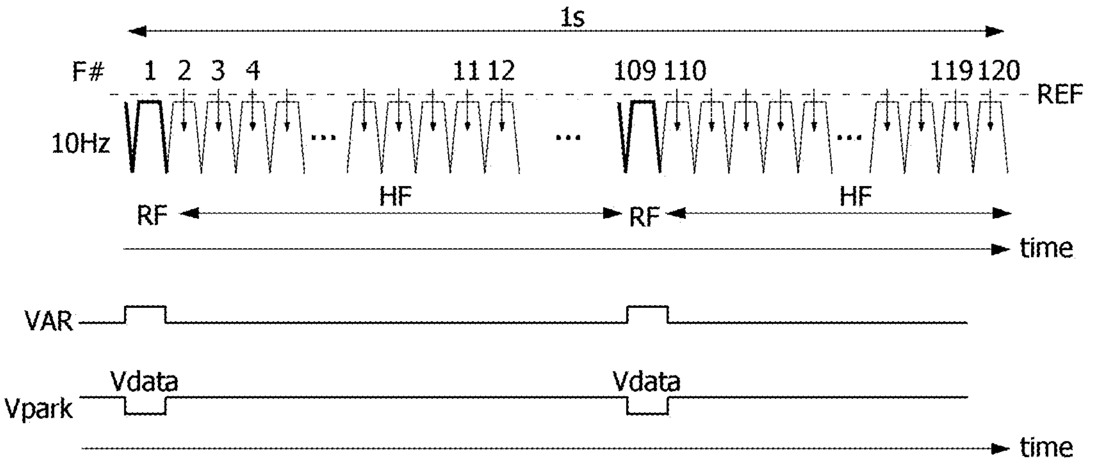

Next, FIGS. 6A to 6E are waveform diagrams illustrating the luminance characteristics according to the driving frequency of the pixels and the compensation voltage. Flicker can be measured based on the amount of change in luminance of a pixel on a time axis. In more detail, FIGS. 6A to 6D illustrate the luminance characteristics of the pixels in which the flicker is measured in the pixels due to the change in the threshold voltage characteristic of the driving element according to the change in the driving frequency of the pixels when no compensation voltages Vpark, VOBS, and VAR are applied to the pixels. Also, FIG. 6E illustrates the improvement in the luminance characteristics of the pixels when the first to third compensation voltages Vpark, VOBS, and VAR are applied to the pixels. In FIGS. 6A to 6E, "F #" indicates a frame number from a first frame to 120th frame (1 to 120 frames), and "REF" indicates a luminance reference value that represents the luminance of the pixels when a data voltage with the same white grayscale value is applied to the pixels.

In particular, FIG. 6A illustrates the luminance characteristics of the pixels when the pixels are driven at a refresh frame frequency of 120 Hz. In FIG. 6A, the pixels are supplied with the data voltage Vdata of pixel data at 120 Hz every frame. In this instance, because the data voltage Vdata is applied every frame, the luminance of the pixels is measured to be constant when the applied data voltage Vdata is the same, and thus no flicker is visible. Therefore, the flicker values of the pixels can be measured constantly as the same value.

Next, FIG. 6B illustrates the luminance characteristics of the pixels when the pixels are driven at a refresh frame frequency of 10 Hz. In FIG. 6B, the data voltage Vdata is applied to the pixels in the refresh frames (1, . . . 109) set to have time intervals of 12 frame periods in one second (1 s), and no data voltage Vdata is applied to the pixels in the hold frames (2~12, . . . 110~120) between the refresh frames. Thus, the luminance of the pixels can be lowered in the refresh frames (1, . . . 109), and the threshold voltage Vth characteristic of the driving element DT can change during the hold frame periods (2~12, . . . 110~120), causing the luminance of the pixels to increase over time due to the change in the gate-source voltage Vgs. In this instance, the luminance of the pixels fluctuates at a periodic rate of 10 Hz, so that a flicker of 10 Hz can be measured.

FIG. 6C illustrates the luminance characteristics of the pixels when the pixels are driven at a refresh frame frequency of 10 Hz with an off duration set for each frame period. Here, the off duration is the time interval during which the light-emitting element EL is turned off by the gate-off voltage leg of the EM signal. In FIG. 6C, the data voltage Vdata is applied to the pixels in the refresh frames (1, . . . 109) set to have time intervals of 12 frame periods in one second (1 s), and no data voltage Vdata is applied to the pixels in the hold frames (2~12, . . . 110~120). Thus, the luminance of the pixels can be lowered in the refresh frames (1, . . . 109), and the luminance of the pixels can change due to the change in the gate-source voltage of the driving element DT during the hold frame periods (2~12, . . . 110~120). In this instance, the luminance of the pixels fluctuates at a periodic rate of 10 Hz, so that a flicker of 10 Hz can be measured. In FIG. 6C, the dashed circle denotes the time period during which the luminance of the pixels changes.

In addition, FIG. 6D illustrates the luminance characteristics of the pixels when the pixels are driven at a refresh frame frequency of 10 Hz with an off duration set for each frame period. In FIG. 6D, the data voltage Vdata is applied to the pixels in the refresh frames (1, . . . 109) set to have time intervals of 12 frame periods in one second (1 s), and no data voltage Vdata is applied to the pixels in the hold frames (2~12, . . . 110~120). When the second compensation voltage VOBS is applied to the second node n2 of the pixel circuit during the periods of the refresh frames (1, . . . 109) and the hold frames (2~12, . . . 110~120), the luminance difference of the pixels is reduced during the periods of the hold frame (2~12, . . . 110~120). In this instance, as shown by the dashed circle, the luminance of the pixels can be lower in the periods of the refresh frames (1, . . . 109) than in the periods of the hold frame (2~12, . . . 110~120). In this instance, the luminance of the pixels fluctuates at a periodic rate of 10 Hz, so that a flicker of 10 Hz can be measured.

Next, FIG. 6E illustrates the luminance characteristics of the pixels when the pixels are driven at a refresh frame frequency of 10 Hz with an off duration set for each frame period. In FIG. 6E, the data voltage Vdata is applied to the pixels in the refresh frames (1, . . . 109) set to have time intervals of 12 frame periods in one second (1 s), and no data voltage Vdata is applied to the pixels in the hold frames (2~12, . . . 110~120). When the first to third compensation voltages Vpark, VOBS, and VAR are applied to the pixel circuit during the periods of the hold frames (2~12, . . . 110~120), the luminance difference of the pixels between the periods of the refresh frames (1, . . . 109) and the hold frames (2~12, . . . 110~120) is further reduced. In this instance, the luminance difference of the pixels can be minimized to the extent that no flicker is measured during the periods of the refresh frames (1, . . . 109) and the hold frames (2~12, . . . 110~120).

In more detail, the first compensation voltage Vpark is applied to the data line DL during the hold frames (2~12, . . . 110~120). Also, the second and third compensation voltages VOBS and VAR can be generated as alternating voltage in which the voltage changes between the refresh frame RF and the hold frame HF, and applied to the power lines PL1 and PL2.

Next, FIG. 7 is a circuit diagram illustrating a pixel circuit according to another embodiment of the present disclosure. Referring to FIG. 7, the pixel circuit includes a light-emitting element EL, a driving element DT for driving the light-emitting element EL, a plurality of switch elements M1 to M7, and a capacitor Cst.

Figure 8:
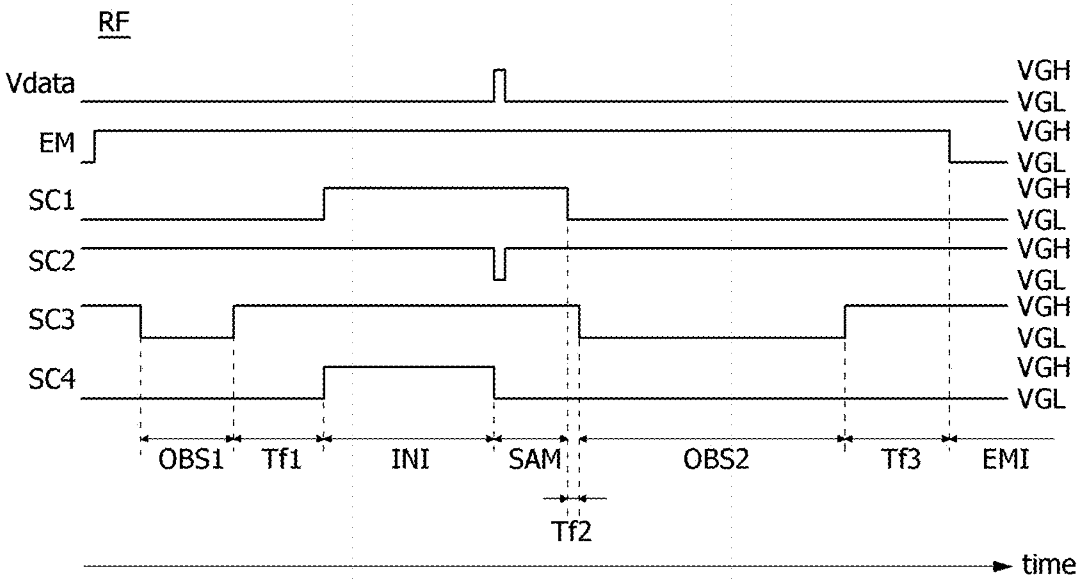
FIG. 8 is a waveform diagram illustrating gate signals and a data voltage generated during a refresh frame.
Figure 10:
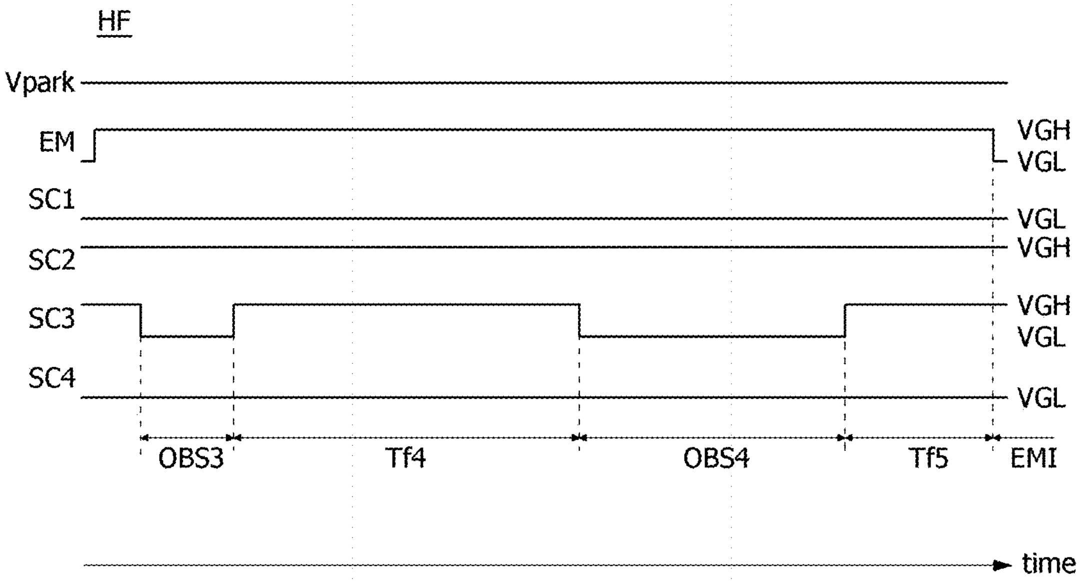
FIG. 10 is a waveform diagram illustrating gate signals and a first compensation voltage generated during a hold frame.

In addition, fourth and fifth switch elements M4 and M5 each can be implemented as an n-channel oxide TFT with a low off-current characteristic. Also, the driving element DT and first, second, third, sixth, and seventh switch elements M1, M2, M3, M6, and M7 can be implemented as a p-channel LTPS TFT with a high on-current characteristic. Further, the n-channel oxide TFT is turned on in response to the gate-high voltage VGH, while it is turned off in response to the gate-low voltage VGL, as illustrated in FIGS. 8 and 10. Also, the p-channel LTPS TFT is turned on in response to the gate-low voltage VGL, while it is turned off in response to the gate-high voltage VGH, as illustrated in FIGS. 8 and 10.

In addition, the pixel circuit is connected to the data line DL to which the data voltage Vdata of pixel data and the first compensation voltage Vpark are applied, and to gate lines GL1 to GL5 to which gate signals SC1 to SC4, and EM are applied. The data driver 110 supplies the data voltage Vdata to the data lines DL in the refresh frame RF and does not output the data voltage Vdata in the hold frame. In the hold frame, the first compensation voltage Vpark is supplied to the data lines DL, and the first compensation voltage Vpark can be output from the compensation voltage generator 160.

Further, the pixel circuit can be connected to a first power line PL1 to which the second compensation voltage VOBS is applied, a second power line PL2 to which the third compensation voltage VAR is applied, a third power line PL3 to which the pixel driving voltage ELVDD is applied, a fourth power line PL4 to which the cathode voltage ELVSS is applied, and a fifth power line PL5 to which the initialization voltage Vinit is applied. On the display panel, the power lines PL1 to PL5 can be commonly connected to all of the pixels 101.

In addition, the pixel driving voltage ELVDD and the cathode voltage ELVSS are set to a voltage that allows the driving element DT to operate in a saturation region. For example, the pixel driving voltage ELVDD can be set to a voltage between 2V and 3V, and the cathode voltage ELVSS can be set to a voltage between −8V and −10V, but are not limited thereto. The gate-high voltage VGH can also be set to a voltage higher than the pixel driving voltage ELVDD, and the gate-low voltage VGL can be set to a voltage lower than the cathode voltage ELVSS, but are not limited thereto.

Further, the data voltage Vdata can have a dynamic range between 2V and 6V. Within this dynamic range, the voltage level of the data voltage Vdata is selected depending on a grayscale value of the pixel data. Also, the initialization voltage Vinit can set to, but is not limited to, a voltage lower than a lower limit of the data voltage Vdata and higher than the cathode voltage ELVSS. For example, when the data voltage Vdata has a lower limit voltage of 2V and the cathode voltage ELVSS has a lower limit voltage of −9V, the initialization voltage Vinit can be set to a voltage between −5V and −7V.

Figure 13:
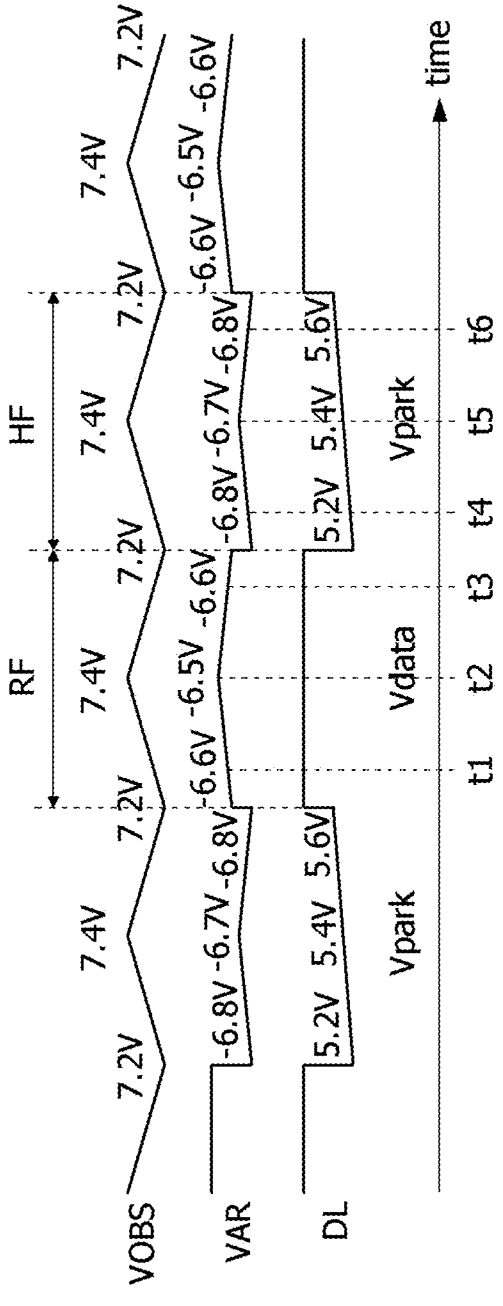
FIG. 13 is a waveform diagram illustrating compensation voltages according to another embodiment of the present disclosure.

In addition, the first compensation voltage Vpark can be set within a voltage range less than a dynamic range the data voltage Vdata within the dynamic range. For example, when the data voltage Vdata has a dynamic range between 2V and 6V, the first compensation voltage Vpark can be set to a specific voltage between 4V and 6V as shown in FIG. 5, or can be varied within this voltage range. Based on the flicker measurement value identified for each position of the display area AA, the voltage of the first compensation voltage Vpark can be varied depending on the pixel position of the display area AA, as shown in FIG. 13.

Further, the second compensation voltage VOBS can be set within a voltage range that partially overlaps the dynamic range of the data voltage Vdata. For example, when the data voltage Vdata has a dynamic range between 2V and 6V, the second compensation voltage VOBS can be set to a specific voltage between 4V and 8V as shown in FIG. 5, or can be varied within this voltage range. Based on the flicker measurement value identified for each position of the display area AA, the voltage of the second compensation voltage VOBS can vary depending on the pixel position of the display area AA, as shown in FIG. 13.

Also, the third compensation voltage VAR can be set to a specific voltage, or it can be varied. For example, when the data voltage Vdata has a dynamic range between 2V and 6V, the third compensation voltage VAR can be set to a specific voltage between −4V and −8V as shown in FIG. 5, or can be varied within this voltage range. Based on the flicker measurement value identified for each position of the display area AA, the voltage of the third compensation voltage VAR can vary depending on the pixel position of the display area AA, as shown in FIG. 13.

In addition, the compensation voltages Vpark, VOBS, and VAR applied to one sub-pixel present at a certain position in the display area AA can be set to different voltages. The gate signals SC1 to SC4 and EM can include pulses that swing between the gate-high voltage VGH and the gate-low voltage VGL. For the pixel circuit shown in FIG. 7, the gate driver 120 can include a first shift register that outputs a first scan signal SC1, a second shift register that outputs a second scan signal SC2, a third shift register that outputs a third scan signal SC3, a fourth shift register that outputs a fourth scan signal SC4, and a fifth shift register that outputs an EM signal EM. Each of the first to fifth shift registers outputs pulses and shifts the pulses sequentially during the refresh frame. Also, the first, second, and fourth shift registers have very low power consumption because they do not output pulses during the hold frame HF.

Further, the driving element DT includes a gate electrode connected to a first node n1, a first electrode connected to a second node n2, and a second electrode connected to a third node n3. As shown in FIG. 7, the capacitor Cst is connected between a node on the third power line PL3, to which the pixel driving voltage ELVDD is applied, and the first node n1. The light-emitting element EL includes an anode electrode connected to the fourth node n4 and a cathode electrode connected to the fourth power line PL4 to which the cathode voltage ELVSS is applied.

In addition, the first switch element M1 is connected between the data line DL and the second node n2 and is turned on in response to the gate-low voltage VGL of the second scan signal SC2. When the first switch element M1 is turned on, the data line DL to which the data voltage Vdata of the pixel data is applied is connected to the second node n2. Also, the first switch element M1 includes a gate electrode connected to the second gate line GL2 to which the second scan signal SC2 is applied, a first electrode connected to the data line DL, and a second electrode connected to the second node n2.

Further, the second switch element M2 is connected between the second node n2 and the first power line PL1 to which the second compensation voltage VOBS is applied and is turned on in response to the gate-low voltage VGL of the third scan signal SC3. When the second switch element M2 is turned on, the second compensation voltage VOBS is applied to the second node n2. As shown, the second switch element M2 includes a gate electrode connected to a third gate line GL3 to which the third scan signal SC3 is applied, a first electrode connected to the second node n2, and a second electrode connected to the first power line PL1.

As shown in FIG. 7, the third switch element M3 is connected between a fourth node n4 and the second power line PL2 to which the third compensation voltage VAR is applied. The third switch element M3 is also turned on in response to the gate-low voltage VGL of the third scan signal SC3. When the third switch element M3 is turned on, the third compensation voltage VAR is applied to the anode electrode of the light-emitting element EL connected to the fourth node n4. Further, as shown, the third switch element M3 includes a gate electrode connected to the third gate line GL3, a first electrode connected to the fourth node n4, and a second electrode connected to the second power line PL2.

In addition, the fourth switch element M4 is connected between the first node n1 and the fifth power line PL5 to which the initialization voltage Vinit is applied and is turned on in response to the gate-high voltage VGH of the fourth scan signal SC4. When the fourth switch element M4 is turned on, the initialization voltage Vinit is applied to the capacitor Cst and to the gate electrode of the driving element DT. As shown, the fourth switch element M4 includes a gate electrode connected to the fourth gate line GL4 to which the fourth scan signal SC4 is applied, a first electrode connected to the first node n1, and a second electrode connected to the fifth power line PL5.

In addition, as shown in FIG. 7, the fifth switch element M5 is connected between the first node n1 and the third node n3 and is turned on in response to the gate-high voltage VGH of the first scan signal SC1. When the fifth switch element M5 is turned on, the first node n1 is connected to the third node n3. Therefore, when the fifth switch element M5 is turned on, the driving element DT is operated as a diode with its gate electrode connected with second electrode. As shown, the fifth switch element M5 includes a gate electrode connected to the first gate line GL1 to which the first scan signal SC1 is applied, a first electrode connected to the first node n1, and a second electrode connected to the third node n3.

Further, as shown in FIG. 7, the sixth switch element M6 is connected between the third power line PL3, to which the pixel driving voltage ELVDD is applied, and the second node n2. The sixth switch element M6 is also turned on in response to the gate-low voltage VGL of the EM signal EM. When the sixth switch element M6 is turned on, the pixel driving voltage ELVDD is applied to the second node n2. As shown, the sixth switch element M6 includes a gate electrode connected to the fifth gate line GL5 to which the EM signal EM is applied, a first electrode connected to the third power line PL3, and a second electrode connected to the second node n2.

In addition, the seventh switch element M7 is connected between the third node n3 and the fourth node n4 and turns on in response to the gate-low voltage VGL of the EM signal EM to connect the third node n3 to the fourth node n4. As shown in FIG. 7, seventh switch element M7 includes a gate electrode connected to the fifth gate line GL5, a first electrode connected to the third node n3, and a second electrode connected to the fourth node n4.

Next, FIG. 8 is a waveform diagram illustrating the gate signals and the data voltage generated during the refresh frame RF, and FIGS. 9A to 9E are circuit diagrams illustrating the operation of the pixel circuit during the refresh frame RF in stages. Referring to FIG. 8, the driving period of the pixels can be divided into a first on-bias period OBS1, an initialization period INI, a sampling period SAM, a second on-bias period OBS2, and a light emission period EMI during the refresh frame RF. A first floating period Tf1 can be set between the first on-bias period OBS1 and the initialization period INI, and a second floating period Tf2 can be set between the sampling period SAM and the second on-bias period OBS2. A third floating period Tf3 can also be set between the second on-bias period OBS2 and the light emission period EMI.

During the first on-bias period OBS1, the voltage of the first, third, and fourth scan signals SC1, SC3, and SC4 is the gate-low voltage VGL and the voltage of the second scan signal SC2 is the gate-high voltage VGH. Also, the voltage of the EM signal EM is the gate-high voltage VGH during the first on-bias period OBS1. Therefore, during the first on-bias period OBS1, the second and third switch elements M2 and M3 are turned on, as shown in FIG. 9A, to apply the second compensation voltage VOBS to the second node n2 and the third compensation voltage VAR to the fourth node n4.

Figure 9A:
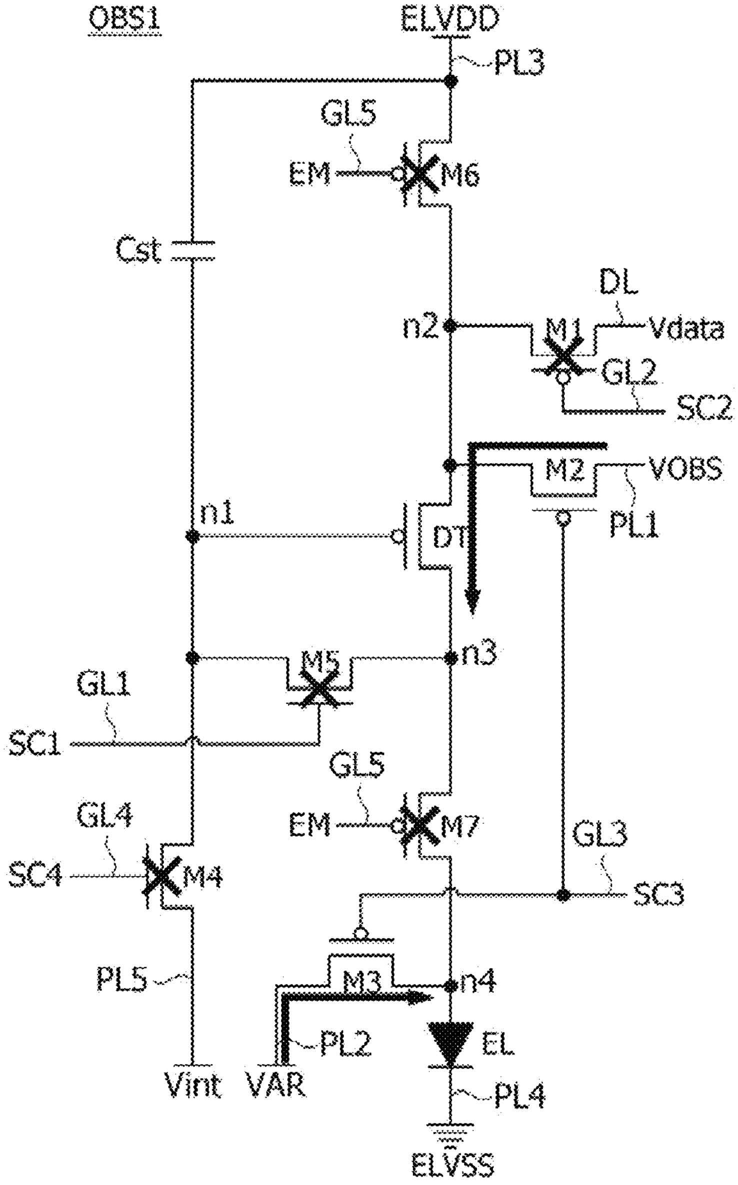
FIG. 9A is a circuit diagram illustrating an operation of a pixel circuit in a first on-bias period of a refresh frame.

During the first on-bias period OBS1, the first, fourth, fifth, sixth, and seventh switch elements M1, M4, M5, M6, and M7 are in the off-state, as shown in FIG. 9A. During the first on-bias period OBS1, the driving element DT can be turned on, but no current is supplied to the light-emitting element EL because the seventh switch element M7 is in the off-state. In addition, the light-emitting element EL does not emit light during the first on-bias period OBS1 because the voltage difference between the third compensation voltage VAR and the cathode voltage ELVSS is less than the threshold voltage of the light-emitting element EL.

During the first on-bias period OBS1, the driving element DT is turned on, so that the voltage of the second and third nodes n2 and n3 becomes the second compensation voltage VOBS, and the voltage of the fourth node n4 becomes the third compensation voltage VAR. In this instance, the voltage of the first node n1 can be a voltage of Vdata+Vth obtained by adding the threshold voltage Vth of the driving element DT to the previously stored data voltage Vdata.

During the first floating period Tf1, the voltage of the first and fourth scan signals SC1 and SC4 is the gate-low voltage VGL, and the voltage of the second and third scan signals SC2 and SC3 is the gate-high voltage VGH. Also, the voltage of the EM signal EM is the gate-high voltage VGH during the first floating period Tf1. Therefore, during the first floating period Tf1, the first to fourth nodes n1, n2, n3, and n4 are floated to maintain their previous state because the first to seventh switch elements M1 to M7 are all in the off-state.

Figure 9B:
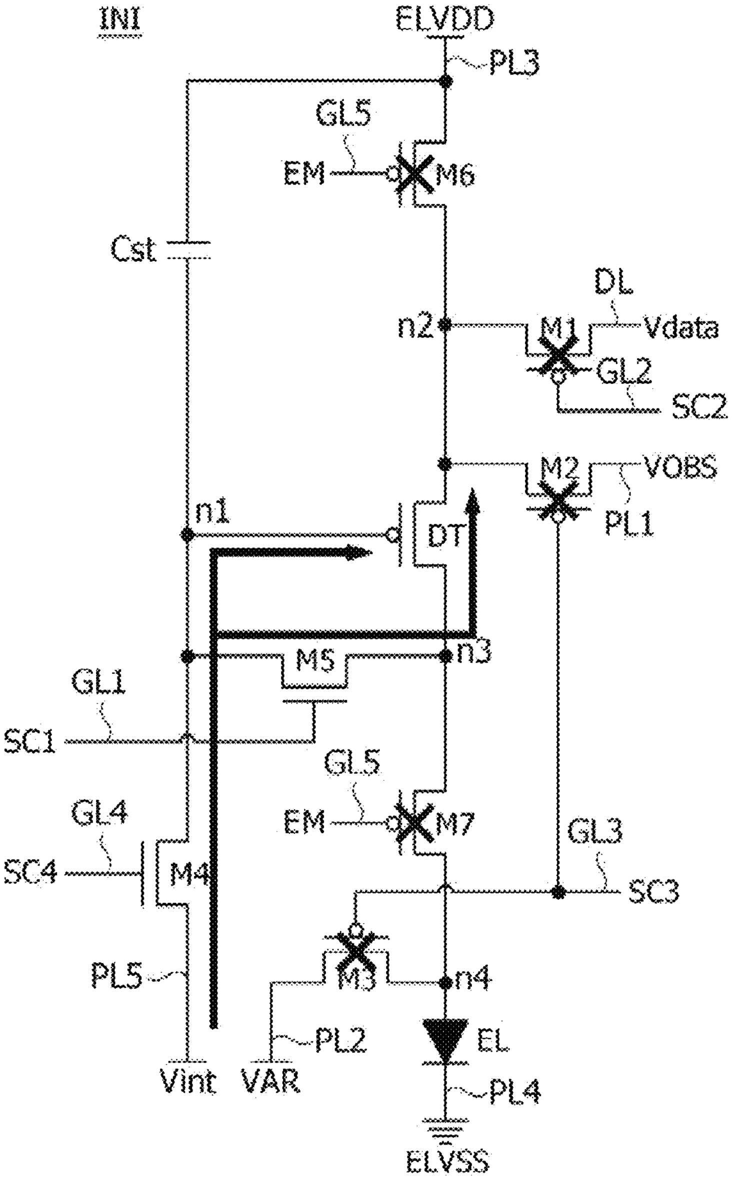
FIG. 9B is a circuit diagram illustrating an operation of a pixel circuit in an initialization period of a refresh frame.

During the initialization period INI, the voltage of the first to fourth scan signals SC1, SC2, SC3, and SC4 and the EM signal EM is the gate-high voltage VGH. Therefore, during the initialization period INI, as shown in FIG. 9B, the fourth and fifth switch elements M4 and M5 are turned on to apply the initialization voltage Vinit to the first and third nodes n1 and n3, and also to apply the initialization voltage Vinit to the second node n2 through the driving element DT, which remains in the on-state. During the initialization period INI, the light-emitting element EL is in the off-state and therefore does not emit light, and also the voltage of the first, second, and third nodes n1, n2, and n3 is the initialization voltage Vinit. Further, the fourth node n4 is floated to maintain its previous state because the third and seventh switch elements M3 and M7 are in the off-state.

Figure 9C:
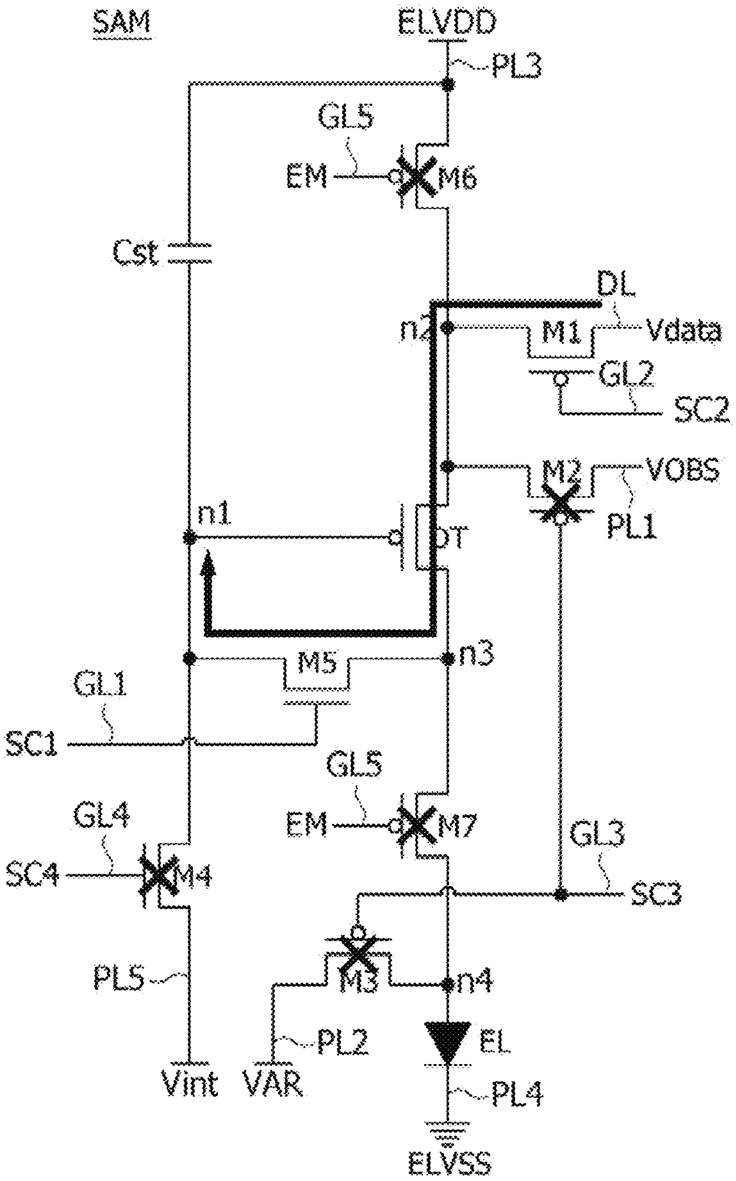
FIG. 9C is a circuit diagram illustrating an operation of a pixel circuit in a sampling period of a refresh frame.

During the sampling period SAM, the voltage of the second scan signal SC2 is generated by a scan pulse of the gate-low voltage VGL synchronized with the data voltage Vdata of the pixel data, and then inverted to the gate-high voltage VGH. Also, during the sampling period SAM, the voltage of the first and third scan signals SC1 and SC3 and the EM signal EM is the gate-high voltage VGH, and the voltage of the fourth scan signal SC4 is the gate-low voltage VGL. When the first switch element M1 is turned on in response to the gate-low voltage of the scan pulse in the sampling period SAM, as shown in FIG. 9C, the data voltage Vdata is applied to the second node n2, and the data voltage Vdata is also applied to the first and third nodes n1 and n3 through the driving element DT in the on-state. In this instance, the voltage of the second node n2 is the data voltage Vdata, and the voltage of each of the first and third nodes n1 and n3 is a voltage of Vdata+Vth, which is obtained by adding the threshold voltage Vth of the driving element DT to the data voltage Vdata. Further, the fourth node n4 is in a floating state, and the light-emitting element EL is in the off-state and therefore does not emit light.

During the second floating period Tf2, the voltage of the first and fourth scan signals SC1 and SC4 is the gate-low voltage VGL, and the voltage of the second and third scan signals SC2 and SC3 is the gate-high voltage VGH. Also, the voltage of the EM signal EM is the gate-high voltage VGH during the second floating period Tf2. Therefore, during the second floating period Tf2, the first to fourth nodes n1, n2, n3, and n4 are floated to maintain their previous states because the first to seventh switch elements M1 to M7 are all in the off-state.

Figure 9D:
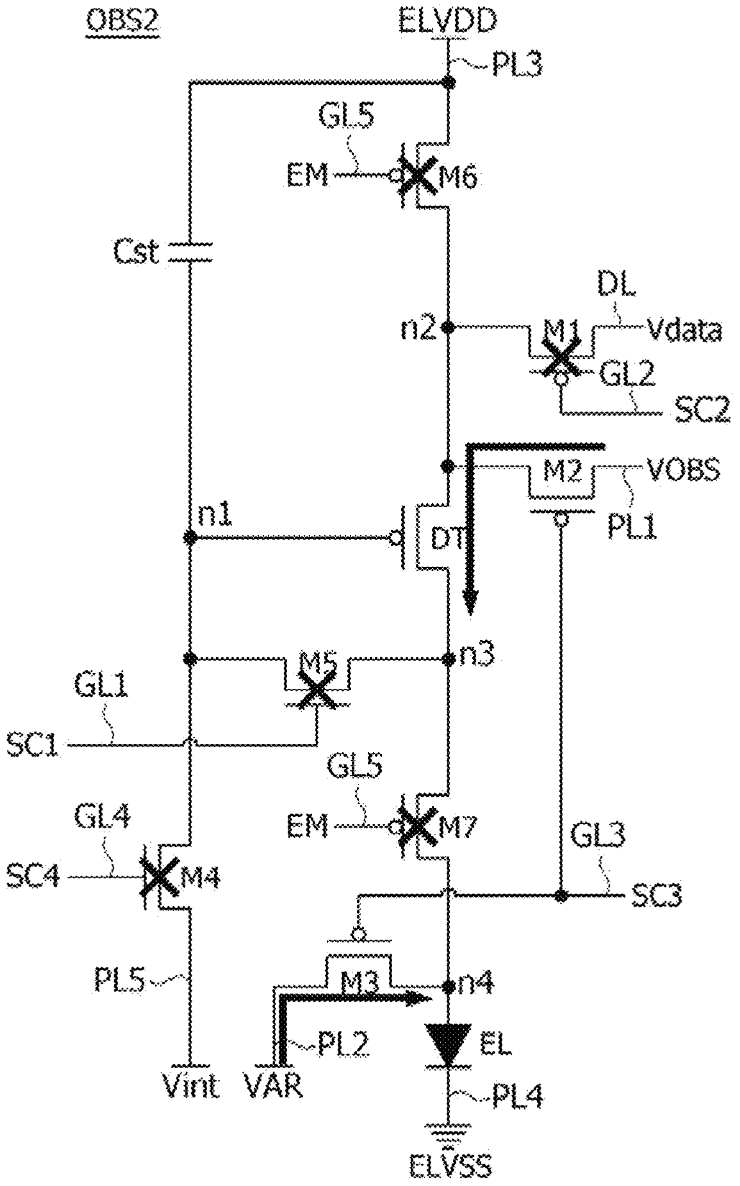
FIG. 9D is a circuit diagram illustrating an operation of a pixel circuit in a second on-bias period of a refresh frame.

During the second on-bias period OBS2, the voltage of the first, third, and fourth scan signals SC1, SC3, and SC4 is the gate-low voltage VGL and the voltage of the second scan signal SC2 is the gate-high voltage VGH. In addition, the voltage of the EM signal EM is the gate-high voltage VGH during the second on-bias period OBS2. Also, during the second on-bias period OBS2, the first, fourth, fifth, sixth, and seventh switch elements M1, M4, M5, M6, and M7 are in the off-state, as shown in FIG. 9D. Therefore, during the second on-bias period OBS2, the second and third switch elements M2 and M3 are turned on, as shown in FIG. 9D, to apply the second compensation voltage VOBS to the second node n2 and the third compensation voltage VAR to the fourth node n4. In addition, during the second on-bias period OBS2, the light-emitting element EL does not emit light. During the second on-bias period OBS2, the voltage of the second and third nodes n2 and n3 is the second compensation voltage VOBS, and the voltage of the fourth node n4 is the third compensation voltage VAR. In this instance, the voltage of the first node n1 can remain in the previous state and therefore can be a voltage of Vdata+Vth.

During the third floating period Tf3, the voltage of the first and fourth scan signals SC1 and SC4 is the gate-low voltage VGL, and the voltage of the second and third scan signals SC2 and SC3 is the gate-high voltage VGH. Further, the voltage of the EM signal EM is the gate-high voltage VGH during the third floating period Tf3. Therefore, during the third floating period Tf3, the first to fourth nodes n1, n2, n3, and n4 are floated to maintain their previous states because the first to seventh switch elements M1 to M7 are all in the off-state.

Figure 9E:
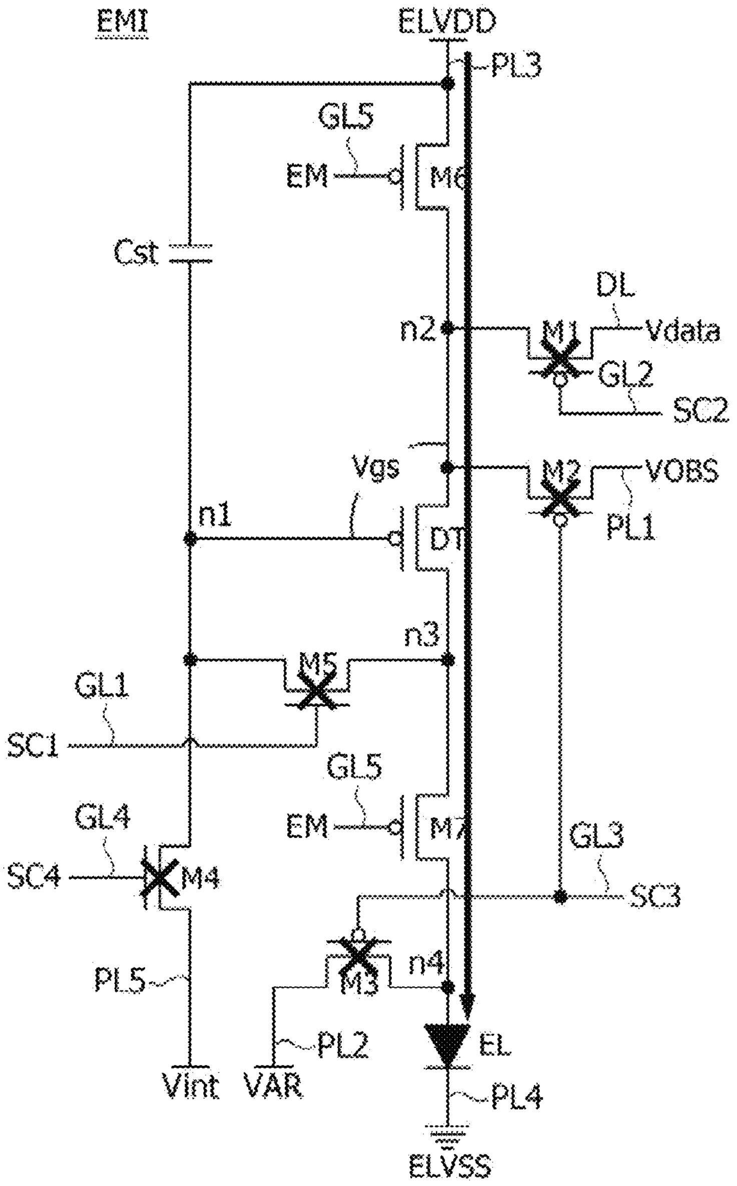
FIG. 9E is a circuit diagram illustrating an operation of a pixel circuit in a light emission period of a refresh frame.

In addition, during the light emission period EMI of the refresh frame RF, the voltage of the first and fourth scan signals SC1, SC4 and the EM signal EM is the gate-low voltage VGL, and the voltage of the second and third scan signals SC2 and SC3 is the gate-high voltage VGH. During the light emission period EMI, as shown in FIG. 9E, the sixth and seventh switch elements M6 and M7 are turned on in response to the gate-low voltage VGL of the EM signal EM. Therefore, a current path is formed between the pixel driving voltage ELVSS and the light-emitting element EL during the light emission period EMI.

Further, during the light emission period EMI, a current, which is determined according to the gate-source voltage of the driving element DT, flows through the light-emitting element EL so that the light-emitting element EL can emit light at a luminance corresponding to the grayscale value of the pixel data. During the light emission period EMI, the first to fifth switch elements M1 to M5 are in the off-state.

Next, FIG. 10 is a waveform diagram illustrating the gate signals and the first compensation voltage generated during the hold frame HF. Referring to FIG. 10, the driving period of the pixels can be divided into a third on-bias period OBS3, a fourth on-bias period OBS4, and a light emission period EMI during the hold frame HF. Also, a four floating period Tf4 can be set between the third on-bias period OBS3 and the fourth on-bias period OBS4, and a fifth floating period Tf5 can be set between the fourth on-bias period OBS4 and the light emission period EMI.

In addition, the data driver 110 does not output the data voltage Vdata during the hold frame HF. During the hold frame HF, the first compensation voltage Vpark is applied to the data lines DL. Also, during the hold frame HF, the voltage of the first and fourth scan signals SC1 and SC4 is held at the gate-low voltage VGL, and the voltage of the second scan signal SC2 is held at the gate-high voltage VGH. Therefore, the first, fourth, and fifth switch elements M1, M4, and M5 in the pixel circuit remain in the off-state during the hold frame HF. During the hold frame HF, the pixel circuit can thus be driven with the capacitor voltage stored during the previous refresh frame RF.

Figure 11A:
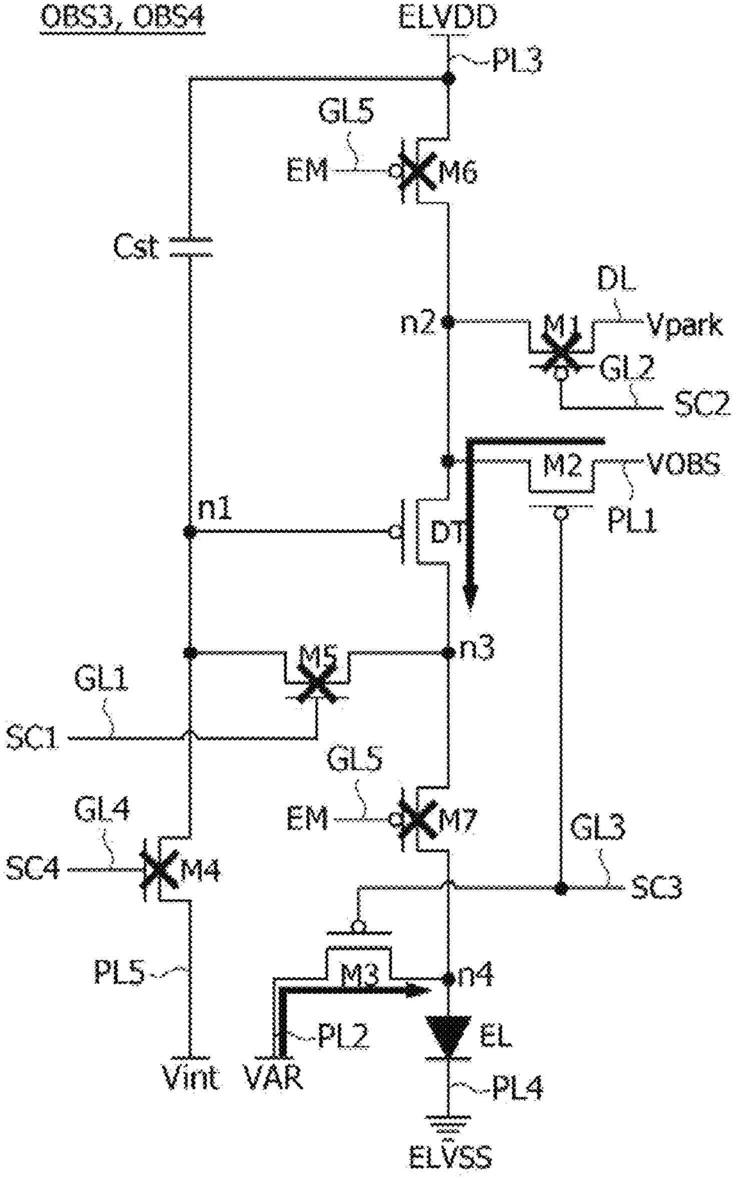
FIG. 11A is a circuit diagram illustrating an operation of a pixel circuit in an on-bias period of a hold frame.

During the third on-bias period OBS3, the voltage of the first, third, and fourth scan signals SC1, SC3, and SC4 is the gate-low voltage VGL and the voltage of the second scan signal SC2 is the gate-high voltage VGH. The voltage of the EM signal EM is also the gate-high voltage VGH during the third on-bias period OBS3. Therefore, during the third on-bias period OBS3, as shown in FIG. 11A, the second and third switch elements M2 and M3 are turned on to apply the second compensation voltage VOBS to the second node n2 and the third compensation voltage VAR to the fourth node n4. During the third on-bias period OBS3, the first, fourth, fifth, sixth, and seventh switch elements M1, M4, M5, M6, and M7 is in the off-state. During the third on-bias period OBS3, the voltage of the first node n1 is held at a voltage of Vdata+Vth, and the light-emitting element EL does not emit.

As shown in FIG. 10, during the fourth floating period Tf4, the voltage of the first and fourth scan signals SC1 and SC4 is the gate-low voltage VGL, and the voltage of the second and third scan signals SC2 and SC3 is the gate-high voltage VGH. Further, the voltage of the EM signal EM is the gate-high voltage VGH during the fourth floating period Tf4. Therefore, during the fourth floating period Tf4, the first to fourth nodes n1, n2, n3, and n4 are floated to maintain their previous states because the first to seventh switch elements M1 to M7 are all in the off-state.

During the fourth on-bias period OBS4, the voltage of the first, third, and fourth scan signals SC1, SC3, and SC4 is the gate-low voltage VGL and the voltage of the second scan signal SC2 is the gate-high voltage VGH. Further, the voltage of the EM signal EM is the gate-high voltage VGH during the fourth on-bias period OBS4. Therefore, during the fourth on-bias period OBS4, as shown in FIG. 11A, the second and third switch elements M2 and M3 are turned on to apply the second compensation voltage VOBS to the second node n2 and the third compensation voltage VAR to the fourth node n4. During the fourth on-bias period OBS4, the first, fourth, fifth, sixth, and seventh switch elements M1, M4, M5, M6, and M7 are in the off-state, and the voltage of the first node n1 is maintained at a voltage of Vdata+Vth, and the light-emitting element EL does not emit light.

In addition, during the fifth floating period Tf5, the voltage of the first and fourth scan signals SC1 and SC4 is the gate-low voltage VGL, and the voltage of the second and third scan signals SC2 and SC3 is the gate-high voltage VGH. Also, the voltage of the EM signal EM is the gate-high voltage VGH during the fifth floating period Tf5. Therefore, during the fifth floating period Tf5, the first to fourth nodes n1, n2, n3, and n4 are floated to maintain their previous states because the first to seventh switch elements M1 to M7 are all in the off-state.

Further, the first compensation voltage Vpark is supplied to the data lines DL during the hold frame HF. Because the second compensation voltage VOBS is applied to the second node n2 through the turned-on second switch element M2 during the on-bias periods OBS3 and OBS4 of the hold frame HF, the first compensation voltage Vpark has little effect on the first and second nodes n1 and n2 during the on-bias periods OBS1 and OBS2.

Figure 11B:
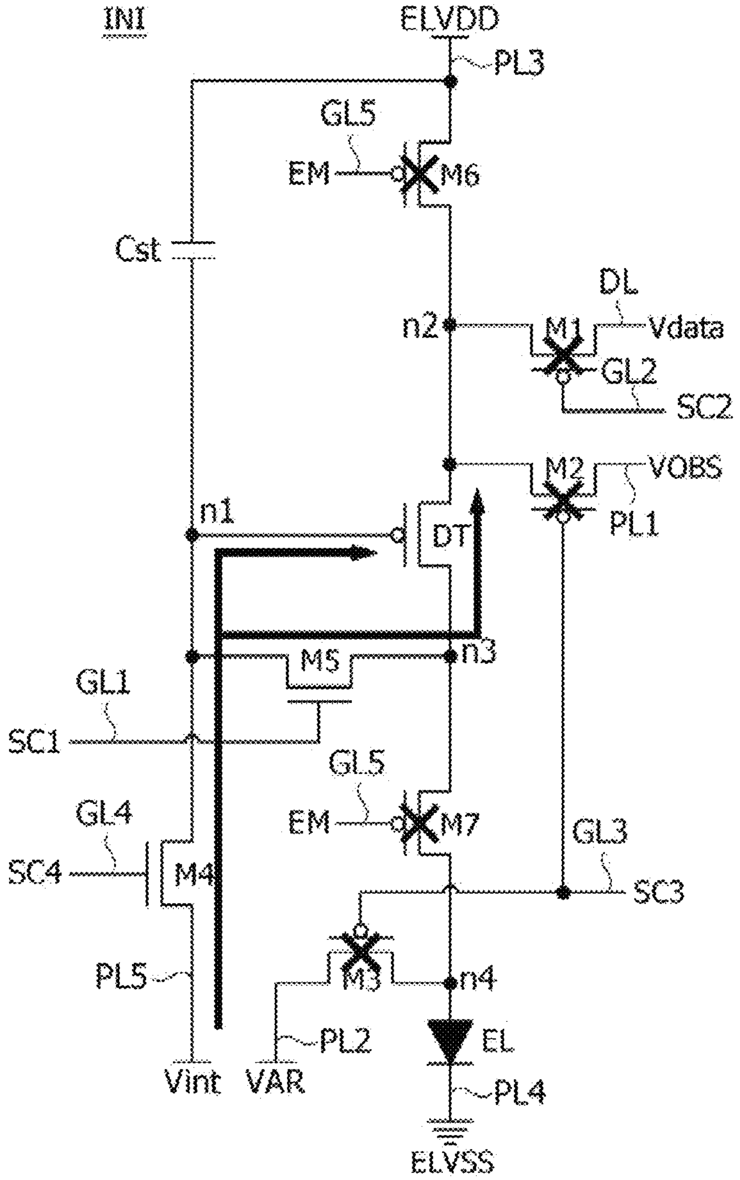
FIG. 11B is a circuit diagram illustrating an operation of a pixel circuit in a floating period of a hold frame.

During the floating periods Tf4 and Tf5 of the hold frame HF, the second compensation voltage VOBS is not applied to the second node n2 because all of the switch elements M1 to M7 in the pixel circuit are in the off-state. Thus, as shown in FIG. 11B, during the floating periods Tf4 and Tf5 of the hold frame HF, the first compensation voltage Vpark can affect the voltages of the first and second nodes n1 and n2 of the pixel circuit, thereby allowing the luminance of the pixel to be appropriately adjusted.

Also, the first compensation voltage Vpark changes the voltage of the second node n2 by the leakage current of the first switch element M1. In addition, the first compensation voltage Vpark affects the voltage of the first node n1 by means of the parasitic capacitance (Cp) between the first node n1 and the second node n2, causing the voltage of the first node n1 to change. This first compensation voltage Vpark helps reduce the luminance difference of the pixels between the refresh frame RF and the hold frame HF, as shown in FIG. 6E.

Figure 11C:
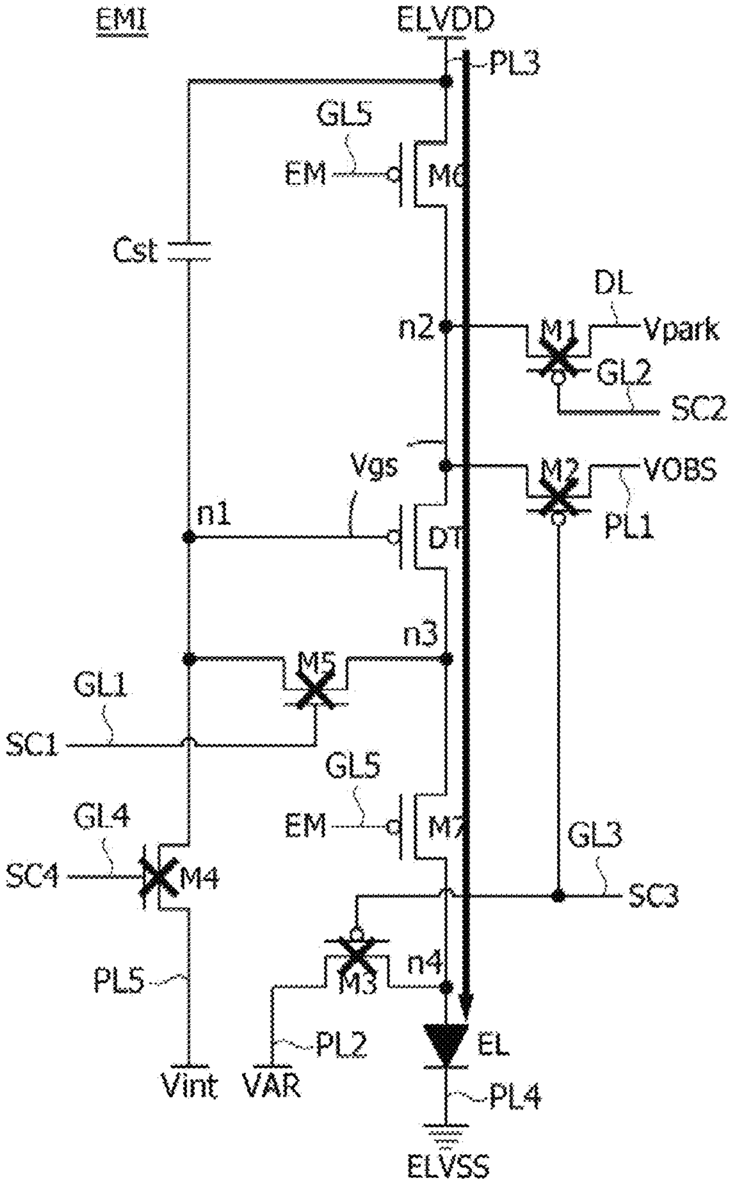
FIG. 11C is a circuit diagram illustrating an operation of a pixel circuit in a light emission period of a refresh frame.

As shown in FIG. 10, the light emission period EMI of the refresh frame HF, the voltage of the first and fourth scan signals SC1, SC4 and the EM signal EM is the gate-low voltage VGL, and the voltage of the second and third scan signals SC2 and SC3 is the gate-high voltage VGH. During the light emission period EMI, the sixth and seventh switch elements M6 and M7 are turned on in response to the gate-low voltage VGL of the EM signal EM. Therefore, as shown in FIG. 11C, a current path is formed between the pixel driving voltage ELVSS and the light-emitting element EL during the light emission period EMI. During the light emission period EMI, the light-emitting element EL can be emitted by the current generated according to the gate-source voltage of the driving element DT stored in the capacitor Cst.

In addition, the inventors measured the flicker of the pixels for each position of the display area AA, and determined that the first, second, and third compensation voltages Vpark, VOBS, and VAR at which the flicker is minimized can differ depending on the pixel positions. As a result of the experiments, an example of the compensation voltage at which the flicker characteristic is optimized is shown in, but not limited to FIGS. 12 and 13. Also, the voltage value of the compensation voltage can vary depending on the pixel structure or the driving method of the display panel.

Figure 12:
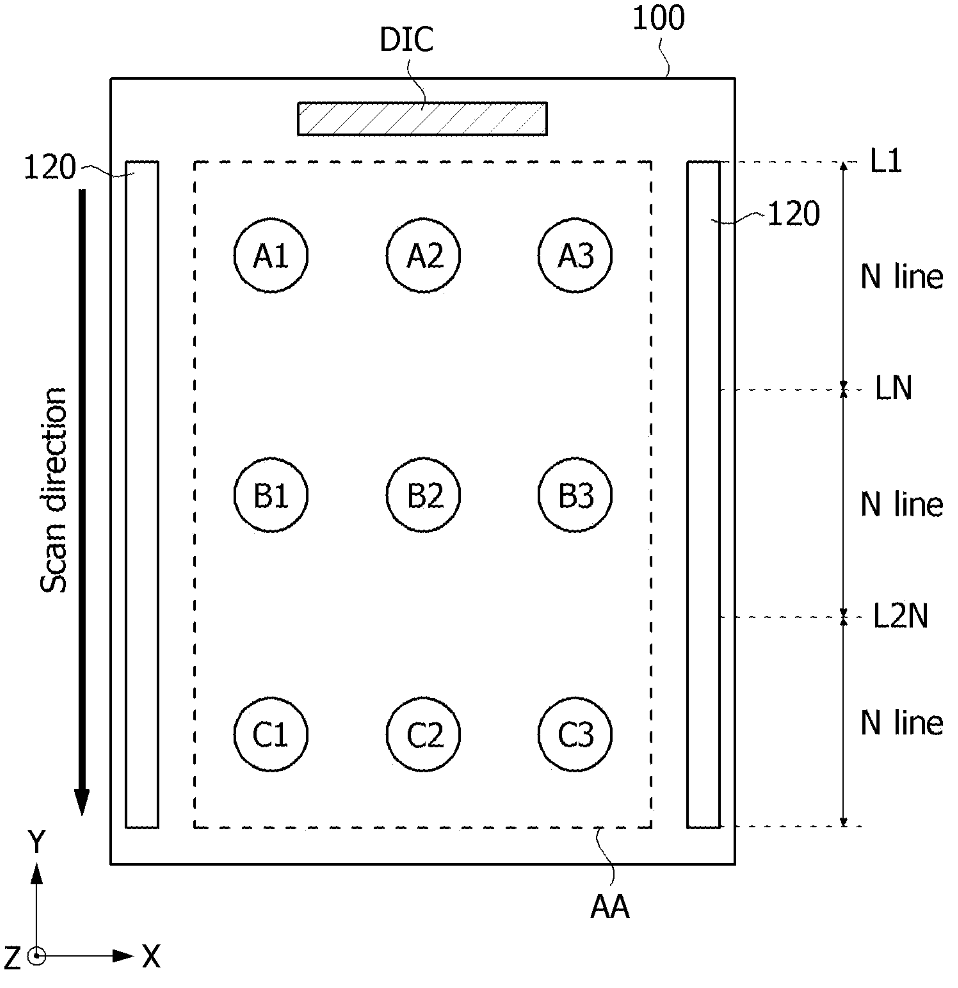
FIG. 12 is a diagram illustrating an example of pixels to which different compensation voltages are applied depending on location of the display area.

Referring to FIGS. 12 and 13, each of the first to third compensation voltages Vpark, VOBS, and VAR can be varied within one frame period to ensure that it is provided as an optimized voltage for each position of the pixel. Each of the first to third compensation voltages Vpark, VOBS, and VAR can be, but is not limited to, varied in the refresh frame RF period and the hold frame HF period. For example, flicker can be improved over the prior art by varying the first to third compensation voltages Vpark, VOBS, and VAR in either the refresh frame RF period or the hold frame HF period.

In addition, the voltage level of the first compensation voltage Vpark can rise continuously during the hold frame HF period. Also, the voltage levels of the second and third compensation voltages can rise and then fall in each of the refresh frame RF period and the hold frame HF period. For example, the compensation voltages Vpark, VOBS, and VAR applied to the pixels A1, A2, and A3 located in the upper portion of the display area AA can be as follows: Vpark=5.2V, VOBS=7.2V, VAR=−6.8V. In contrast, the compensation voltages Vpark, VOBS, and VAR applied to the pixels B1, B2, and B3 located in the central portion of the display area AA can be as follows: Vpark=5.4V, VOBS=7.4V, VAR=−6.7V. Also, the compensation voltages Vpark, VOBS, and VAR applied to the pixels C1, C2, and C3 located in the lower portion of the display area AA can be as follows: Vpark=5.6V, VOBS=7.2V, VAR=−6.6V.

Further, the shift register of the gate driver 120 sequentially shifts the pulses of the gate signals SC1 to SC4 and EM, along the scan direction shown in FIG. 12. Therefore, the second and third compensation voltages VOBS and VAR are applied sequentially to the pixel lines L1 to Ln along the pulse shift direction of the third scan signal SC3. Thus, the second and third compensation voltages VOBS and VAR can be applied to the pixels as the same voltage along the line direction X in FIG. 12 and as different voltages along the column direction Y with different scan timings.

Because the first compensation voltage Vpark is supplied to the data lines DL along the column direction Y, it can be applied as a different voltage to each of the pixels arranged in the same line direction X. In addition, the first compensation voltage Vpark can be applied to the data lines DL as a different voltage for each horizontal period in synchronization with the scanning of the pixels, so that the different voltage can be applied to each of the pixels arranged in the same column direction Y.

During the refresh frame RF, the data voltage Vdata of the pixel data is applied to the data lines DL, and the gate signals SC1 to SC4 and EM are sequentially applied to the gate lines GL1 to GL5 on a pixel-line basis along the scan direction. Further, the refresh frame RF period can include the time points of t1, t2, and t3. At the time t1, the data voltage Vdata and the compensation voltages VOBS and VAR, which are set to as VOBS=7.2V and VAR=−6.6V, can be applied to the first to third pixels A1, A2, and A3. Also, the second and third compensation voltages VOBS and VAR applied to the first to third pixels A1, A2, and A3 can be generated as different voltages at the time point t1. At the time t2, the data voltage Vdata and the compensation voltages VOBS and VAR, which are set to as VOBS=7.4V and VAR=−6.7V, are applied to the pixels fourth to sixth B1, B2, and B3. Therefore, each of the second and third compensation voltages VOBS and VAR is changed to a higher voltage at the time t2 than at the time t1.

At the time t3, the data voltage Vdata and the compensation voltages VOBS and VAR, which are set to as VOBS=7.2V and VAR=−6.6V, can be applied to the seventh to ninth pixels C1, C2, and C3. Therefore, each of the second and third compensation voltages VOBS and VAR is changed to a lower voltage at the time t3 than at the time t2.

During the hold frame HF, the first compensation voltage Vpark is applied to the data lines DL, and only the pulse of the third scan signal SC3 among the gate signals SC1 to SC4 and EM is sequentially applied to the third gate line GL3 on a pixel-line basis along the scan direction. Also, the hold frame HF period can include the time points of t4, t5, and t6. At time t4, the compensation voltages Vpark, VOBS, and VAR, which are set to as Vpark=[5.2V], VOBS=7.2V, and VAR=−6.8V, can be applied to the first to third pixels A1, A2, and A3. Further, the compensation voltages Vpark, VOBS, and VAR applied to the first to third pixels A1, A2, and A3 can be generated as different voltages at the time t1. At the time t5, the compensation voltages Vpark, VOBS, and VAR, which are set to as Vpark=5.4V, VOBS=7.4V, and VAR=−6.7V, can be applied to the fourth to sixth pixels B1, B2, and B3. Therefore, each of the compensation voltages Vpark, VOBS, and VAR can be changed to a higher voltage at the time t5 than at the time t4.

At the time t6, the compensation voltages Vpark, VOBS, and VAR, which are set to as Vpark=5.6V, VOBS=7.2V, and VAR=−6.8V, can be applied to the fourth to sixth pixels C1, C2, and C3. Therefore, each of the second and third compensation voltages VOBS and VAR can be changed to a lower voltage at the time t6 than at the time t5. Also, the first compensation voltage Vpark can be change to a higher voltage at the time t6 than at the time t5.

Figure 14:
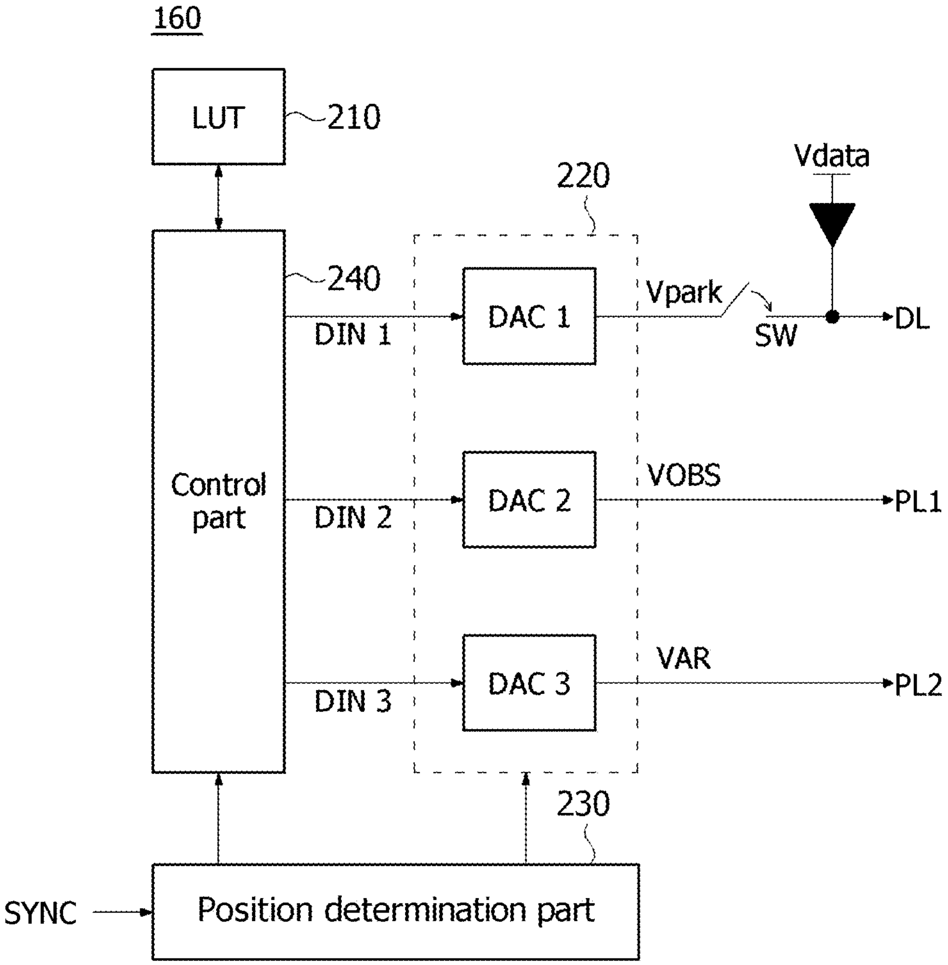
FIG. 14 is a diagram illustrating a compensation voltage generator according to one embodiment of the present disclosure.

Next, FIG. 14 is a diagram illustrating a compensation voltage generator 160 according to one embodiment of the present disclosure. Referring to FIG. 14, the compensation voltage generator 160 includes a position determination part 230, a data storage part 210, a control part 240, and a voltage output part 220.

As shown in FIG. 14, the position determination part 230 receives a timing signal SYNC that is synchronized with the pixel data of the input image. Further, the position determination part 230 can include a counter that counts the timing signal SYNC as a clock and can determine the frame period and horizontal period of the currently input image by counting the timing signal SYNC. The position determination part 230 also generates the frame period of the input image and the position information of a pixel at which a pixel data is written based on the count result of the timing signal SYNC, and then provides the same to the control part 240 and the voltage output part 220.

Further, the timing signal SYNC input to the position determination part 230 can include a vertical synchronization signal Vsync, a horizontal synchronization signal Hsync, and a data enable signal DE. The pulse of the vertical sync signal Vsync is also generated at intervals of one frame period (or vertical period) to indicate one frame period. In addition, the horizontal synchronization signal Hsync indicates one horizontal period, and a pulse width of the second scan signal SC2 for writing the pixel data to the pixels can be one horizontal period. The data enable signal DE can indicate a data valid interval and one horizontal period, including a pulse that occurs every horizontal period within the active interval during which the pixel data is input within the one frame period.

In addition, the data storage part 210 stores the compensation data set independently depending on the position of each pixel. Compensation data indicating a voltage at which the flicker measurement value is minimized for each pixel can thus be set as look-up table (LUT) data. The compensation data is also digital data. Further, the compensation data can be assigned to each pixel and can include a first compensation data DIN1 indicating a voltage level of the first compensation voltage Vpark, a second compensation data DIN2 indicating a voltage level of the second compensation voltage VOBS, and a third compensation data DIN3 indicating a voltage level of the third compensation voltage VAR. Each of the compensation data DIN1, DIN2, and DIN3 can include data of the refresh frame RF and data of the hold frame HF, separated by a refresh frame RF and a hold frame HF. The data storage part 210 thus provides the control part 240 with the compensation data stored at an address corresponding to the location information received from the control part 240.

Further, the control part 240 provides the compensation data DIN1, DIN2, and DIN3 selected according to the position information synchronized with the pixel data to the voltage output part 220, thereby controlling the voltage of each of the compensation voltages Vpark, VOBS, and VAR for each pixel. The timing controller 130 shown in FIG. 1 can include or control the compensation voltage generator 160.

In addition, as shown in FIG. 14, the voltage output part 220 includes a first digital to analog converter (DAC), a second DAC, and a third DAC. In particular, the voltage output part 220 can be embedded in an integrated circuit along with the power supply 140 shown in FIG. 1, or can be mounted on a printed circuit board (PCB) along with the timing controller 130 and the power supply 140.

Further, the first DAC converts the first compensation data DIN1 to an analog voltage and outputs the first compensation voltage Vpark. The first compensation voltage Vpark can also be applied to the data lines DL through the switch element SW. In more detail, the switch element SW can be implemented as a transistor that is maintained in the off-state during the refresh frame RF period and is turned on during the hold frame HF period under the control of the control part 240. The switch element SW can also be embedded in an integrated circuit together with the data driver 110 or mounted on the non-display area BZ of the display panel 100.

When the switch element SW is in the off-state, the data voltage Vdata is applied to the data lines DL, while the first compensation voltage Vpark is applied to the data lines DL when the switch element SW is turned on. When the switch element SW is turned on, the data driver 110 does not output the data voltage Vdata.

Also, the second DAC converts the second compensation data DIN2 to an analog voltage and outputs the second compensation voltage VOBS to the first power line PL1. Further, the third DAC converts the third compensation data DIN3 to an analog voltage and outputs the third compensation voltage VAR to the second power line PL2.

Because the first compensation voltage Vpark is supplied to the data lines DL parallel to the column direction Y, it can be applied as a different voltage to each of the pixels arranged in the same line direction X, and it can also be applied as a different voltage to each of the pixels arranged in the column direction Y. In addition, the second and third compensation voltages VOBS and VAR can be applied as the same voltage in the line direction X of the display area AA, and can be applied as different voltages to the pixels in the column direction Y.

Figure 15:
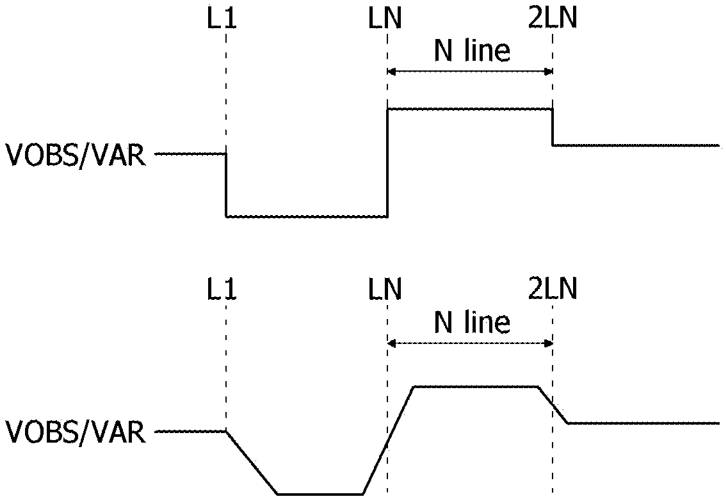
FIG. 15 are diagrams illustrating a stepwise variable method and a linear variable method for a compensation voltage.

As illustrated in FIG. 15, the second and third compensation voltages VOBS and VAR can be varied rapidly in the form of a step or can be changed in the form of a linear voltage having a predetermined slope. These voltage variable schemes can be selected according to the flicker level or screen uniformity of the image reproduced in the display area AA. In FIGS. 12 and 15, "LN" denotes an $N^{th}$ line, and "L2N" denotes an $2N^{th}$ line. There can be N lines of pixels between the $N^{th}$ line and the $2N^{th}$ line.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display device comprising:

a display panel including data lines, gate lines, power lines, and sub-pixels;

a gate driver to supply a gate signal to the gate lines;

a data driver configured to supply a data voltage to the data lines during a refresh frame period prior to a hold frame period; and a compensation voltage generator configured to:

during the hold frame period:

output a first compensation voltage to the data lines instead of the data voltage supplied by the data driver, and output a second compensation voltage and a third compensation voltage to the power lines connected to the sub-pixels, and during the refresh frame period:

output the second compensation voltage and the third compensation voltage to the power lines without outputting the first compensation voltage.

2. The display device of claim 1, wherein the compensation voltage generator is further configured to vary a voltage value at least one of the first compensation voltage, the second compensation voltage, and the third compensation voltage.

3. The display device of claim 1, wherein each of the sub-pixels includes:

a light-emitting element;

a driving element including a gate electrode connected to a first node, a first electrode connected to a second node, a second electrode connected to a third node, and configured to drive the light-emitting element;

a first switch element connected between the data lines and the second node and configured to supply the data voltage to the second node in response to a second scan signal;

a second switch element connected between a first power line to which the second compensation voltage is applied and the second node and configured to supply the second compensation voltage to the second node in response to a third scan signal; and a third switch element connected between a second power line to which the third compensation voltage is applied and an anode electrode of the light-emitting element, and configured to supply the third compensation voltage to the anode electrode of the light-emitting element during the refresh frame period and the hold frame period, and wherein the first switch element maintains an off-state during the hold frame period.

4. The display device of claim 1, wherein the compensation voltage generator is further configured to generate at least one of the second and third compensation voltages to have a higher voltage level in the refresh frame period than in the hold frame period.

5. The display device of claim 1, wherein the compensation voltage generator is further configured to vary a voltage level of at least one of the first compensation voltage, the second compensation voltage, and the third compensation voltage within a one frame period.

6. The display device of claim 1, wherein the compensation voltage generator is further configured to generate a voltage level of at least one of the first compensation voltage, the second compensation voltage, and the third compensation voltage to be different depending on a position of the sub-pixel.

7. The display device of claim 1, wherein the compensation voltage generator is further configured to generate a voltage level of the first compensation voltage to continuously rise during the hold frame period, and generate the voltage levels of at least one of the second compensation voltage and the third compensation voltage to rise and then fall in the refresh frame period and the hold frame period.

8. The display device of claim 7, wherein the compensation voltage generator is further configured to generate at least one of the second compensation voltage and the third compensation voltage in the form of a step or in the form of a linear voltage having a predetermined slope.

9. The display device of claim 1, wherein each of the sub-pixels includes:

a driving element including a gate electrode connected to a first node, a first electrode connected to a second node, and a second electrode connected to a third node;

a first switch element connected between the data lines and the second node, and configured to supply the data voltage to the second node during the refresh frame period;

a second switch element connected between a first power line to which the second compensation voltage is applied and the second node, and configured to supply the second compensation voltage to the second node during the refresh frame period and the hold frame period;

a third switch element connected between a second power line to which the third compensation voltage is applied and an anode electrode of a light-emitting element, and configured to supply the third compensation voltage to the anode electrode of the light-emitting element in response to a third scan signal;

a fourth switch element connected between the first node and a fifth power line to which an initialization voltage is applied, and configured to supply the initialization voltage to the first node in response to a fourth scan signal;

a fifth switch element connected between the first node and the third node, and configured to connect the first node to the third node in response to a first scan signal;

a sixth switch element connected between a third power line to which a pixel driving voltage is applied and the second node, and configured to supply the pixel driving voltage to the second node in response to an emission control signal;

a seventh switch element connected between the third node and a fourth node, and configured to connect the third node to the fourth node in response to the emission control signal; and a light-emitting element having an anode electrode connected to the fourth node and a cathode electrode connected to a fourth power line to which a cathode voltage is supplied.

10. The display device of claim 9, wherein the pixel driving voltage is a voltage higher than the cathode voltage, wherein a gate-high voltage of the first scan signal, a second scan signal, the third scan signal and the fourth scan signal and the emission control signal is higher than the pixel driving voltage, and a gate-low voltage of the first to fourth scan signals and the emission control signal is lower than the cathode voltage, and wherein the initialization voltage is a voltage lower than the lower limit voltage of the data voltage and higher than the cathode voltage.

11. The display device of claim 10, wherein the first switch element, the second switch element, the third switch element, the sixth switch element, and the seventh switch element are turned on in response to the gate-low voltage, wherein the fourth switch element and the fifth switch element are turned on in response to the gate-high voltage, and wherein the first switch element, the fourth switch element, and the fifth switch element maintain an off-state during the hold frame period.

12. The display device of claim 11, wherein a driving period of the pixels is divided into a first on-bias period, an initialization period, a sampling period, a second on-bias period, and a light emission period during the refresh frame period, during the first on-bias period, the voltage of the first scan signal, the third scan signal, and the fourth scan signal is the gate-low voltage, and the voltage of the second scan signal and the emission control signal is the gate-high voltage, during the initialization period, the voltage of the first to fourth scan signals and the emission control signal is the gate-high voltage, during the sampling period, the voltage of the second scan signal and the fourth scan signal is the gate-low voltage which is synchronized with the data voltage, and the voltage of the first scan signal, the third scan signal, and the emission control signal is the gate-high voltage, during the second on-bias period, the voltage of the first scan signal, the third scan signal, and the fourth scan signal is the gate-low voltage, and the voltage of the second scan signal and the emission control signal is the gate-high voltage, during the light emission period of the refresh frame period, the voltage of the first scan signal, the fourth scan signal, and the emission control signal is the gate-low voltage, and the voltage of the second scan signal and the third scan signal is the gate-high voltage, and the first to the seventh switch elements are in an off-state during a floating period between the first on-bias period and the initialization period, a floating period between the sampling period and the second on-bias period, and a floating period between the second on-bias period and the refresh frame period.

13. The display device of claim 12, wherein the driving period of the pixels is further divided into a third on-bias period, a fourth on-bias period, and a light emission period during the hold frame period, during the third on-bias period and the fourth on-bias period, the voltage of the first scan signal, the third scan signal, and the fourth scan signal is the gate-low voltage, and the voltage of the second scan signal and the emission control signal is the gate-high voltage, during the light emission period of the hold frame period, the voltage of the first scan signal, the fourth scan signal, and the emission control signal is the gate-low voltage, and the voltage of the second scan signal and the third scan signal is the gate-high voltage, and the first to seventh switch elements are in an off-state during a floating period between the third on-bias period and the fourth on-bias period, and during a floating period between the fourth on-bias period and the light emission period of the hold frame period.

14. A method of driving a display device, the method comprising:

supplying a gate signal to a plurality of gate lines during a refresh frame period and a hold frame period;

supplying a data voltage to a plurality of data lines during the refresh frame period;

during the hold frame period:

supplying a first compensation voltage to the data lines instead of the data voltage; and supplying a second compensation voltage and a third compensation voltage to power lines connected to sub-pixels included in the display device; and during the refresh frame period:

supplying the second compensation voltage and the third compensation voltage to the power lines without supplying the first compensation voltage.

15. The method of claim 14, further comprising:

varying a voltage value of at least one of the first compensation voltage, the second compensation voltage, and the third compensation voltage.

16. The method of claim 14, wherein each of the second and third compensation voltages has a higher voltage level in the refresh frame period than in the hold frame period.

17. The method of claim 14, further comprising:

varying a voltage value of at least one of the first compensation voltage, the second compensation voltage, and the third compensation voltage within a one frame period.

18. The method of claim 14, wherein the voltage level of at least one of the first compensation voltage, the second compensation voltage, and the third compensation voltage is different depending on a position of a sub-pixel in a display panel of the display device.

19. The method of claim 14, wherein a voltage level of the first compensation voltage rises continuously during the hold frame period, and the voltage levels of at least one of the second compensation voltage and the third compensation voltage rise and then fall in the refresh frame period and the hold frame period.

20. A display device comprising:

a display panel including a pixel array including a plurality of data lines, a plurality of gate lines intersecting the data lines, and pixels arranged in a matrix form, and further including power lines connected to constant voltage nodes of the pixels for driving the pixels;

a gate driver to supply a gate signal to the gate lines;

a data driver configured to supply a data voltage to the data lines; and a compensation voltage generator configured to:

output a first value of a first compensation voltage at a first time within a hold frame period, output a first value of a second compensation voltage at the first time within the hold frame period, output a first value of a third compensation voltage at the first time within the hold frame, output a second value of the first compensation voltage different than the first value of the first compensation voltage at a second time within the hold frame period, output a second value of the second compensation voltage different than the first value of the second compensation voltage at the second time within the hold frame period, and output a second value of the third compensation voltage different than the first value of the third compensation voltage at the second time within the hold frame period.

* * * * *